US009997096B2

(12) United States Patent
Shin

(10) Patent No.: US 9,997,096 B2
(45) Date of Patent: Jun. 12, 2018

(54) DISPLAY APPARATUS, ELECTRONIC DEVICE INCLUDING THE SAME, AND METHOD OF OPERATING THE SAME

(71) Applicant: Samsung Electronics Co., Ltd., Suwon-si, Gyeonggi-do (KR)

(72) Inventor: Hyun-chang Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 14/718,654

(22) Filed: May 21, 2015

(65) Prior Publication Data
US 2015/0339967 A1 Nov. 26, 2015

(30) Foreign Application Priority Data
May 21, 2014 (KR) ........................ 10-2014-0061168

(51) Int. Cl.
*G09G 3/20* (2006.01)
*G06F 3/14* (2006.01)
(Continued)

(52) U.S. Cl.
CPC ......... *G09G 3/2003* (2013.01); *G06F 3/1446* (2013.01); *G09G 3/3406* (2013.01); *G09G 3/3666* (2013.01); *G09G 2300/0443* (2013.01); *G09G 2300/0452* (2013.01); *G09G 2320/0233* (2013.01); *G09G 2320/0242* (2013.01); *G09G 2320/0646* (2013.01); *G09G 2320/0673* (2013.01); *G09G 2320/103* (2013.01);
(Continued)

(58) Field of Classification Search
CPC ............. G09G 2320/028; G09G 3/003; G09G 2340/0435; G09G 3/20; G09G 5/14; G09G 3/2003; G09G 2300/0443; G09G 2300/0452; G09G 3/3426
See application file for complete search history.

(56) References Cited
U.S. PATENT DOCUMENTS

2003/0080953 A1 5/2003 Ting
2006/0022968 A1* 2/2006 Kondo ................ G09G 3/3208
345/211
(Continued)

FOREIGN PATENT DOCUMENTS

KR 10-0809713 B1 3/2008
KR 10-2011-0033512 A 3/2011
(Continued)

OTHER PUBLICATIONS

European Search Report dated Jan. 4, 2018, issued in the European Patent Application No. 15796336.4.

*Primary Examiner* — Gerald Johnson
(74) *Attorney, Agent, or Firm* — Jefferson IP Law, LLP

(57) ABSTRACT

A display apparatus, an electronic device including the same, and a method of operating the same are provided. The electronic device includes a display including a first region and a second region, a first driving module configured to generate processing information corresponding to a first image to be displayed in the first region of the display, and a second driving module configured to receive the processing information from the first driving module, and o compensate for a second image to be displayed in the second region of the display, based on the processing information.

42 Claims, 21 Drawing Sheets

(51) Int. Cl.
*G09G 3/34* (2006.01)
*G09G 3/36* (2006.01)

(52) U.S. Cl.
CPC ... *G09G 2330/021* (2013.01); *G09G 2360/04* (2013.01); *G09G 2360/16* (2013.01); *G09G 2370/08* (2013.01)

(56) References Cited

U.S. PATENT DOCUMENTS

| | | | |
|---|---|---|---|
| 2007/0057865 A1* | 3/2007 | Song | G06F 3/1431 345/1.1 |
| 2008/0049034 A1 | 2/2008 | Chin et al. | |
| 2008/0068313 A1* | 3/2008 | Jang | G02F 1/13452 345/87 |
| 2009/0147138 A1* | 6/2009 | Pawlowski | G09G 3/346 348/564 |
| 2009/0322661 A1 | 12/2009 | Bae et al. | |
| 2011/0069081 A1* | 3/2011 | Lee | G06F 3/1438 345/593 |
| 2011/0095965 A1 | 4/2011 | Yoneoka et al. | |
| 2011/0175865 A1* | 7/2011 | Bae | G09G 3/3648 345/204 |
| 2011/0242074 A1* | 10/2011 | Bert | G09G 3/3208 345/207 |
| 2012/0026420 A1* | 2/2012 | Saitoh | G09G 3/3677 349/41 |
| 2012/0075334 A1 | 3/2012 | Pourbigharaz et al. | |
| 2012/0147025 A1 | 6/2012 | Pyo | |
| 2012/0147599 A1* | 6/2012 | Shim | G06F 1/1652 362/231 |
| 2013/0088503 A1* | 4/2013 | Park | G09G 3/20 345/545 |
| 2013/0201176 A1 | 8/2013 | Lee et al. | |
| 2014/0300654 A1 | 10/2014 | Kim et al. | |

FOREIGN PATENT DOCUMENTS

| | | |
|---|---|---|
| KR | 10-2012-0073835 A | 7/2012 |
| KR | 10-2014-0008036 A | 1/2014 |

* cited by examiner

DISPLAY APPARATUS, ELECTRONIC DEVICE INCLUDING THE SAME, AND METHOD OF OPERATING THE SAME

CROSS-REFERENCE TO RELATED APPLICATION(S)

This application claims the benefit under 35 U.S.C. § 119(a) of a Korean patent application filed on May 21, 2014 in the Korean Intellectual Property Office and assigned Serial number 10-2014-0061168, the entire disclosure of which is hereby incorporated by reference.

TECHNICAL FIELD

The present disclosure relates to a display apparatus, an electronic device including the same, and a method of operating the same. More particularly, the present disclosure relates to a display apparatus including a plurality of display driving modules, an electronic device including the same, and a method of operating the same.

BACKGROUND

A display apparatus, applied to electronic products such as notebook computers, televisions (TVs), smartphones, tablet personal computers (PCs), etc., includes a display which displays an image and a display driver which drives the display. The display may include a plurality of gate lines that are arranged in a first direction, a plurality of source lines that are arranged in a second direction, and a plurality of pixels that are arranged in a matrix form and are respectively provided in intersection areas of the gate lines and the source lines. The display driver may include a gate driver that supplies a scan signal to the plurality of gate lines, a source driver that respectively supplies grayscale voltages to the plurality of source lines, and a timing controller that respectively supplies control signals to the gate driver and the source driver. The display driver may include an image processing circuit that performs image processing.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display apparatus, an electronic device including the same, and a method of operating the same, which drive a display without degradation of image quality or occurrence of a color sense difference in a plurality of display regions respectively controlled by a plurality of driving modules, based on processing information generated by at least one of the plurality of driving modules.

In a related art display apparatus that drives a display by using a plurality of driving modules, image quality is degraded or a color sense difference occurs in a plurality of display regions respectively controlled by the plurality of driving modules.

Additional aspects will be set forth in part in the description which follows and, in part, will be apparent from the description, or may be learned by practice of the presented embodiments.

In accordance with an aspect of the present disclosure, an electronic device is provided. The electronic device includes a display including a first region and a second region, a first driving module configured to generate processing information corresponding to a first image to be displayed in the first region of the display, and a second driving module configured to receive the processing information from the first driving module, and to compensate for a second image to be displayed in the second region of the display, based on the processing information.

In accordance with another aspect of the present disclosure, an electronic device is provided. The electronic device includes a first display configured to display a first image, a second display configured to display a second image, a first display driving module configured to control the first display, and to generate first image information corresponding to the first image, a second display driving module configured to control the second display, to generate second image information corresponding to the second image, and to generate compensation data about at least one selected from the first image information and the second image information, and a processor configured to transmit the first image to the first display driving module, and to transmit the second image to the second display driving module.

In accordance with another aspect of the present disclosure, a display apparatus is provided. The display apparatus includes a display panel including a first region and a second region, a first driving module configured to receive a first image to be displayed in the first region from a processor functionally coupled to the display panel, and to generate first image information corresponding to the first image, and a second driving module configured to receive from the processor a second image to be displayed in the second region, and to compensate for the second image, based on the first image information.

In accordance with another aspect of the present disclosure, a method of operating an electronic device is provided. The method includes respectively receiving, by a first driving module and a second driving module, a first image and a second image, generating, by the first driving module, processing information based on the first image, transmitting the processing information to the second driving module, and compensating for, by the second driving module, the second image based on the processing information.

In accordance with another aspect of the present disclosure, an image display method performed by an electronic device is provided. The method includes respectively receiving, by a first driving module and a second driving module, a first image and a second image, generating, by the first driving module, first processing information based on the first image, generating, by the second driving module, second processing information based on the second image, transmitting the first processing information to the second driving module, and generating, by the second driving module, compensation data based on the first processing information and the second processing information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
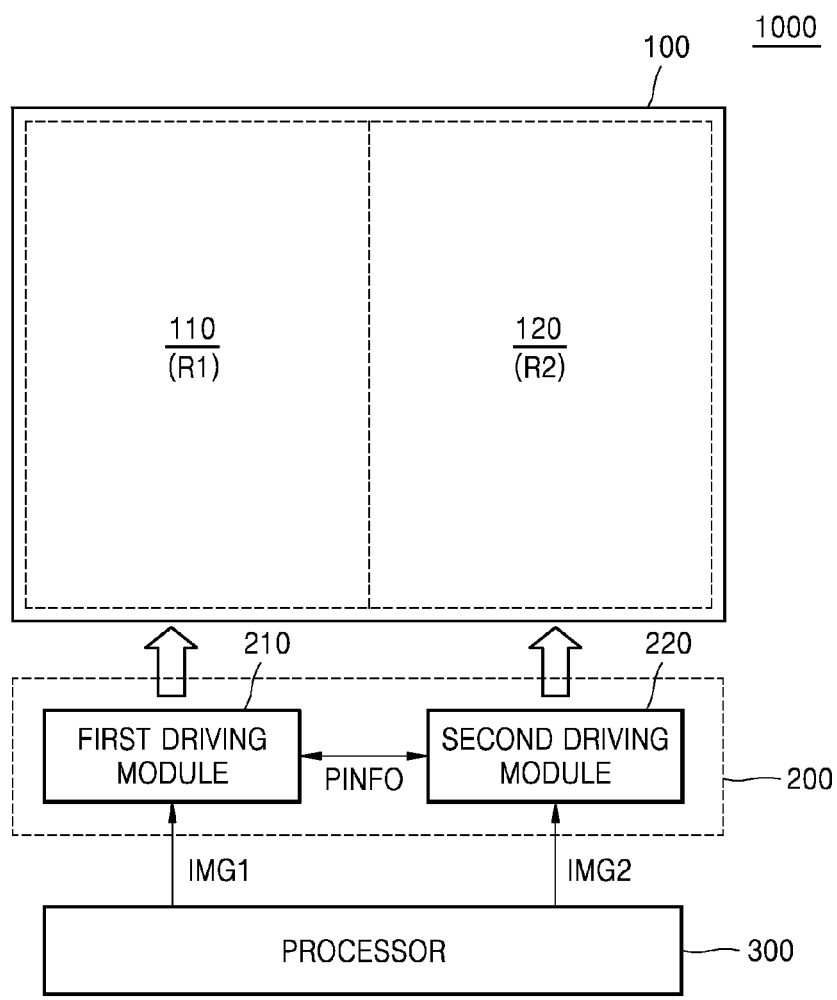
FIG. 1 is a block diagram illustrating an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, example embodiments of the inventive concept will be described in detail with reference to the accompanying drawings. Embodiments of the inventive concept are provided so that this disclosure will be thorough and complete, and will fully convey the concept of the inventive concept to one of ordinary skill in the art. Since the inventive concept may have diverse modified embodiments, preferred embodiments are illustrated in the drawings and are described in the detailed description of the inventive concept. However, this does not limit the inventive concept within specific embodiments and it should be understood that the inventive concept covers all the modifications, equivalents, and replacements within the idea and technical scope of the inventive concept. Like reference numerals refer to like elements throughout.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In various embodiments of the disclosure, the meaning of 'comprise', 'include', or 'have' specifies a property, a region, a fixed number, a step, a process, an element and/or a component but does not exclude other properties, regions, fixed numbers, steps, processes, elements and/or components.

As used herein, the term "or" includes any and all combinations of one or more of the associated listed items. For example, "A or B" may include A, include B, or include A and B.

It will be understood that, although the terms first, second, etc. used herein may qualify various elements according to various embodiments, these elements should not be limited by these terms. For example, the terms do not limit the order and/or importance of corresponding elements. These terms are only used to distinguish one element from another. For example, a first user equipment and a second user equipment are user equipment and denote different user equipment. For example, a first element may be referred to as a second element without departing from the spirit and scope of the inventive concept, and similarly, the second element may also be referred to as the first element.

In the case in which a component is referred to as being "connected" or "accessed" to other component, it should be understood that not only the component is directly connected or accessed to the other component, but also there may exist another component between the components. Meanwhile, in the case in which a component is referred to as being "directly connected" or "directly accessed" to other component, it should be understood that there is no component there between.

In the following description, the technical terms are used only for explain a specific embodiment while not limiting the inventive concept. The terms of a singular form may include plural forms unless referred to the contrary.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device according to various embodiments may be a device including an image display function. For example, the electronic device may be a smartphone, a tablet personal computer (PC), a mobile phone, a video phone, an e-book reader, a desktop PC, a laptop PC, a netbook PC, a personal digital assistant (PDA), a portable multimedia player (PMP), a digital audio player, a mobile medical device, a camera, a wearable device (e.g., a head-mounted device (HMD), electronic clothes, electronic braces, an electronic necklace, an electronic appcessory, an electronic tattoo, or a smart watch), and/or the like.

An electronic device according to some embodiments may be a smart home appliance including an image display function. The smart home appliance may be, for example, a television, a digital video disk (DVD) player, an audio, a refrigerator, an air conditioner, a vacuum cleaner, an oven, a microwave oven, a washer, a dryer, an air purifier, a set-top box, a television (TV) box (e.g., Samsung HomeSync™, Apple TV™, or Google TV™), a gaming console, an electronic dictionary, an electronic key, a camcorder, an electronic picture frame, and/or the like.

An electronic device according to some embodiments may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, an automation teller's machine (ATM), a point of sales (POS), and/or the like.

An electronic device according to some embodiments may be furniture, part of a building/structure, an electronic board, electronic signature receiving device, a projector, various measuring devices (e.g., water, electricity, gas or electro-magnetic wave measuring devices), and/or the like that include an image display function. The electronic device according to some embodiments may be any combination of the foregoing devices. Also, the electronic device according to various embodiments may be a flexible device. In addition, it will be apparent to one having ordinary skill in the art that the electronic device according to various embodiments of the present disclosure is not limited to the foregoing devices.

Hereinafter, an electronic device according to various embodiments will be described in detail with reference to the accompanying drawings. A user used herein may denote a person who uses the electronic device or a device (for example, an artificial intelligence electronic device) that uses the electronic device.

FIG. 1 is a block diagram illustrating an electronic device 1000 according to various embodiments of the present disclosure.

Referring to FIG. 1, the electronic device 1000 may be a display apparatus including a display 100, a display driver 200, and a processor 300.

According to an embodiment, the display 100 may include a plurality of pixels that are arranged in a matrix form, and may display an image in units of a frame. For example, the display 100 may include at least one selected from a liquid crystal display (LCD), a light-emitting diode (LED) display, an organic light-emitting diode (OLED) display, an active-matrix OLED (AMOLED) display, an electrochromic display (ECD), a digital mirror device (DMD), an actuated mirror device (AMD), a grating light value (GLV), a plasma display panel (PDP), an electroluminescent display (ELD), and a vacuum fluorescent display (VFD). Also, the display 100 may include other kinds of flat panel displays, a hologram, or a projector.

According to an embodiment, the display 100 may include a plurality of display regions 110 and 120. For example, as illustrated in FIG. 1, the display 100 may include a first region 110 and a second region 120 which laterally correspond to the display 100. However, this is merely an example, and the present embodiment is not limited thereto. The display 100 may be laterally or vertically implemented in various forms and shapes and may include three or more regions.

According to various embodiments, the first region 110 may display a first image IMG1. The second region 120 may display a second image IMG2. According to an embodiment, the first image IMG1 and the second image IMG2 may be respectively displayed in the first region 110 and the second region 120 at the same time (for example, the images are displayed according to the same clock) or at different times (for example, the image are displayed according to different clocks). The first image IMG1 and the second image IMG2 may be, for example, images constituting one frame. For example, the first image IMG1 may be a portion of an image of the one frame, and the second image IMG2 may be the other portion of the image of the one frame. According to an embodiment, the first image IMG1 and the second image IMG2 may be different images or the same images. However, the technical spirit of the present disclosure is not limited thereto.

According to various embodiments, the display driver 200 may include a plurality of driving modules 210 and 220 and may drive the display 100 so as to display the first image IMG1 and the second image IMG2. According to an embodiment, the display driver 200 may be provided as one semiconductor integrated chip (IC) including the plurality of driving modules 210 and 220. According to another embodiment, the display driver 200 may be provided as a plurality of semiconductor ICs which each include at least one driving module 210 or 220. According to an embodiment, the plurality of driving modules 210 and 220 may be respectively included in different semiconductor ICs.

According to an embodiment, the display driver 200 may receive the first and second images IMG1 and IMG2 from the processor 300 and convert digital signals (e.g., data values of pixels) of the received images into analog signals (for example, grayscale voltages) respectively corresponding to the digital signals. According to another embodiment, the display driver 200 may drive the display 100, based on the converted analog signals and display the first and second images IMG1 and IMG2 in the display 100.

In FIG. 1, the display driver 200 is illustrated as including two of the driving modules 210 and 220 respectively corresponding to two of the display regions 110 and 120 of the display 100. However, this is merely an example, and the present embodiment is not limited thereto. The display driver 200 may include three or more driving modules. The number of driving modules may be determined based on a size, a resolution, or the like of the display 100.

According to an embodiment, the first driving module 210 may drive the first region 110 of the display 100, and the second driving module 220 may drive the second region 120 of the display 100. The first driving module 210 may receive the first image IMG1 from the processor 300 and may display the first image IMG1 on the first region 110 of the display 100. According to an embodiment, the second driving module 220 may receive the second image IMG2 from the processor 300 and may display the second image IMG2 on the second region 110 of the display 100. According to an embodiment, each of the first driving module 210 and the second driving module 220 may be implemented with hardware, software, firmware, an IC, or the like. According to an embodiment, each of the first driving module 210 and the second driving module 220 may be provided as a separate semiconductor IC.

According to various embodiments, at least one of the first and second driving modules 210 and 220 may generate and share processing information PINFO about the first image IMG1 or the second image IMG2 and compensate for the first image IMG1 or the second image IMG2, based on the processing information PINFO. According to an embodiment, the processing information PINFO may include various kinds of information (for example, image quality compensation information, luminance, brightness, a histogram, gamma, a color temperature, a gray scale, linearity, a contrast ratio, a color reproduction rate, sharpness, a color, chroma, contrast, and/or the like) or data (for example, pixel data of at least a portion of an image or compression information of an image) which are generated based on the first image IMG1 or the second image IMG2. According to another embodiment, the processing information PINFO may include an image processing result or an image analysis result of the first and second images IMG1 and IMG2 or pixel data of a portion of each of the first and second images IMG1 and IMG2. For example, the processing information PINFO may include a histogram of each of the first and second images IMG1 and IMG2. As another example, the processing information PINFO may include compression information of each of the first and second images IMG1 and IMG2. As another example, the processing information PINFO may include pixel data of a portion of each of the first and second images IMG1 and IMG2 to be displayed on a boundary portion between the first region 110 and the second region 120 of the display 100. In addition, the processing information PINFO may include processing information that is obtained by processing data in units of a pixel, a line, or a frame.

According to various embodiments, the processor 300 may transfer, to the display driver, an image to be displayed in the display 100 or control signals necessary for an operation of the display driver 200. According to an embodiment, the processor 300 may supply the first image IMG1 to the first driving module 210 and supply the second image IMG2 to the second driving module 220. The processor 300 may include, for example, an application processor (AP), a baseband processor (BBP), a micro-processing unit (MPU), a sensor hub, or the like.

Figure 2:
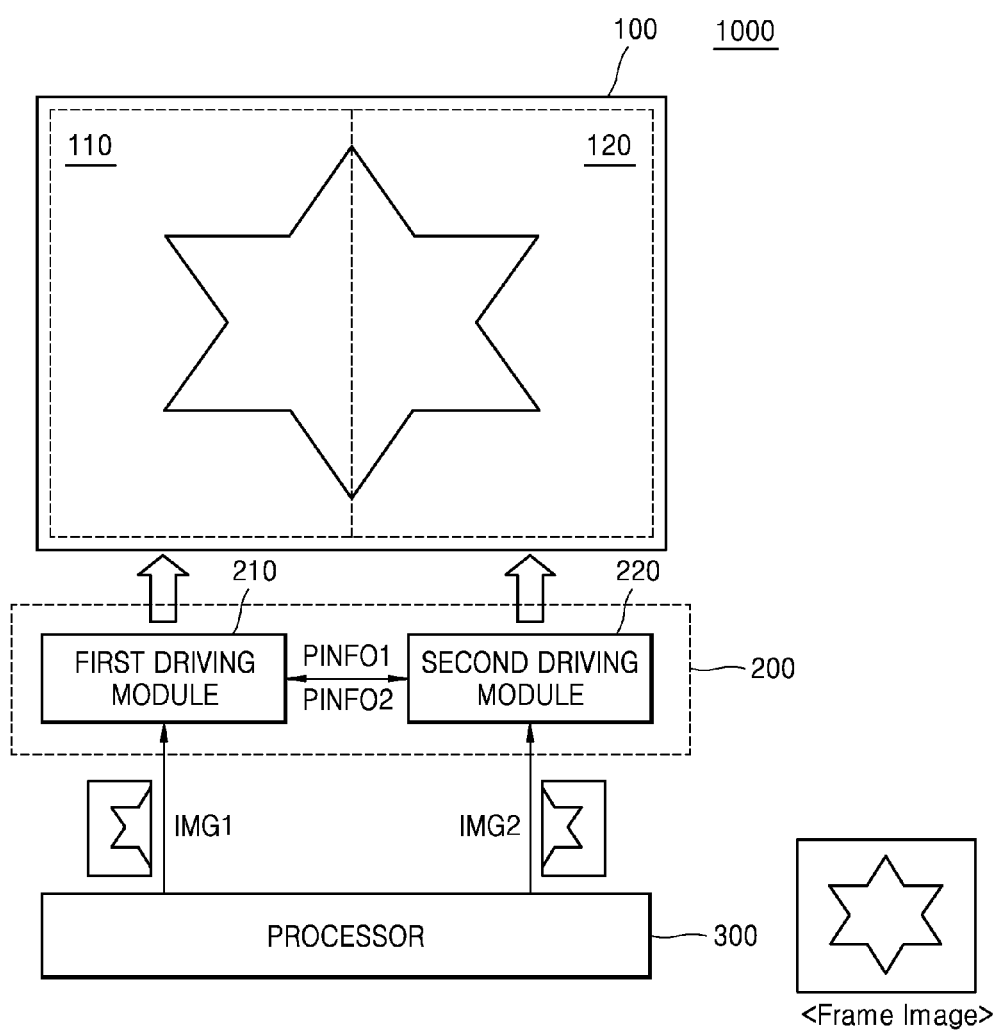
FIG. 2 is a diagram illustrating that one frame image is displayed by a display in an electronic device according to various embodiments of the present disclosure.

FIG. 2 is a diagram illustrating that one frame image is displayed by a display in an electronic device according to various embodiments of the present disclosure.

Referring to FIG. 2, the processor 300 may generate a frame image as the first image IMG1 or the second image IMG2 that is to be respectively displayed in the first region 110 or the second region 120 of the display 100. According to an embodiment, when a left portion and a right portion of the display 100 are respectively classified as the first region 110 and the second region 120, for example, the processor 300 may divide a frame image into the left and the right to generate the first image IMG1 and the second image IMG2. According to an embodiment, the processor 300 may transfer the first image IMG1 to the first driving module 210 and transfer the second image IMG2 to the second driving module 220.

According to various embodiment, the processor 300 may transfer the first image IMG1 to the first driving module 210 along with at least some of processing information (for example, image quality compensation information, luminance, brightness, a histogram, gamma, a color temperature, a gray scale, linearity, a contrast ratio, a color reproduction rate, sharpness, a color, chroma, contrast, and/or the like) of the second image IMG2 and transfer the second image IMG2 to the second driving module 220.

According to various embodiments, the processor 300 may transfer the second image IMG2 to the second driving module 220 along with at least some of processing information (for example, image quality compensation information, luminance, brightness, a histogram, gamma, a color temperature, a gray scale, linearity, a contrast ratio, a color reproduction rate, sharpness, a color, chroma, contrast, and/or the like) of the first image IMG1 and transfer the first image IMG1 to the first driving module 210. According to another embodiment, the processor 300 may transfer the second image IMG2 to the second driving module 220 along with at least some of first processing information PINFO1 of the first image IMG1 and transfer the first image IMG1 to the first driving module 210 along with at least some of second processing information PINFO2 of the second image IMG2.

According to various embodiments, the first driving module 210 or the second driving module 220 may receive or generate the first processing information PINFO1 of the first image IMG1 and the second processing information PINFO2 of the second image IMG2 from the processor 300. According to an embodiment, the first driving module 210 and the second driving module 220 may share the first processing information PINFO1 of the first image IMG1 and the second processing information PINFO2 of the second image IMG2.

According to various embodiments, the first driving module 210 or the second driving module 220 may compensate for the first image IMG1 and the second image IMG2, based on the first processing information PINFO1 and the second processing information PINFO2. According to an embodiment, the first driving module 210 may generate the first processing information PINFO1 corresponding to the first image IMG1 and supply the first processing information PINFO1 to the second driving module 220. The second driving module 220 may compensate for the second image IMG2, based on the first processing information PINFO1 received from the first driving module 210. According to an embodiment, the second driving module 220 may generate the second processing information PINFO2 about the second image IMG2, based on the received first processing information PINFO1 and second image IMG2. The second driving module 220 may compensate for the second image IMG2, based on the second processing information PINFO2. According to an embodiment, the second driving module 220 may compensate for the second image IMG2, based on the received first processing information PINFO1.

According to various embodiments, the second driving module 220 may generate the second processing information PINFO2 corresponding to the second image IMG2 and supply the second processing information PINFO2 to the first driving module 210. The first driving module 210 may compensate for the first image IMG1, based on the second processing information PINFO2 received from the second driving module 220.

According to various embodiments, the first driving module 210 may generate the first processing information PINFO1 corresponding to the first image IMG1 and supply the first processing information PINFO1 to the second driving module 220. According to an embodiment, the second driving module 220 may compensate for the second processing information PINFO2 about an image of a whole frame, based on the received first processing information PINFO1 and second image IMG2.

According to various embodiments, the second driving module 220 may generate compensation data for compensating for a frame image, based on the second processing information PINFO2. For example, the compensation data may include gamma compensation data for controlling a gamma curve of the frame image, luminance compensation data for controlling a luminance of the frame image, or an image scale value for scaling levels of data values of pixels included in the frame image.

According to an embodiment, the second driving module 220 may transfer the second processing information PINFO2 or the compensation data to the first driving module 210, and the first and second driving modules 210 and 220 may respectively compensate for the first image IMG1 and the second image IMG2, based on the second processing information PINFO2 or the compensation data.

According to various embodiments, the first driving module 210 may drive the compensated first image IMG1 to the first region 110 of the display 100, and the second driving module 220 may drive the compensated second image IMG2 to the second region 120. According to an embodiment, the first image IMG1 may be displayed in the first region 110 of the display 100, and the second image IMG2 may be displayed in the second region 120. For example, the first image IMG1 and the second image IMG2 may be simultaneously displayed. Alternatively, the first image IMG1 and the second image IMG2 may be displayed with a predetermined time difference. A user may recognize, as one frame image, the first image IMG1 and the second image IMG2 that are respectively displayed in the first region 110 and the second region 120.

According to various embodiments, when the plurality of driving modules 210 and 220 display an image of one frame in the display 100, a difference (for example, an image quality difference, a brightness difference, a luminance difference, a color temperature difference, a gamma difference, a contrast difference, a color difference, a gray scale difference, and/or the like) recognizable by a user may occur between images which are displayed in the respective regions 110 and 120 driven by the driving modules 210 and 220. According to an embodiment, the plurality of driving modules 210 and 220 may perform image processing and share the first processing information PINFO1 and the second processing information PINFO2. According to another embodiment, the plurality of driving modules 210 and 220 may compensate for a corresponding image or a whole image (for example, a frame image), based on processing information of another image, thereby preventing a difference (for example, an image quality difference, a brightness difference, a luminance difference, a color temperature difference, a gamma difference, a contrast difference, a color difference, a gray scale difference, and/or the like) from occurring between images.

Figure 3:
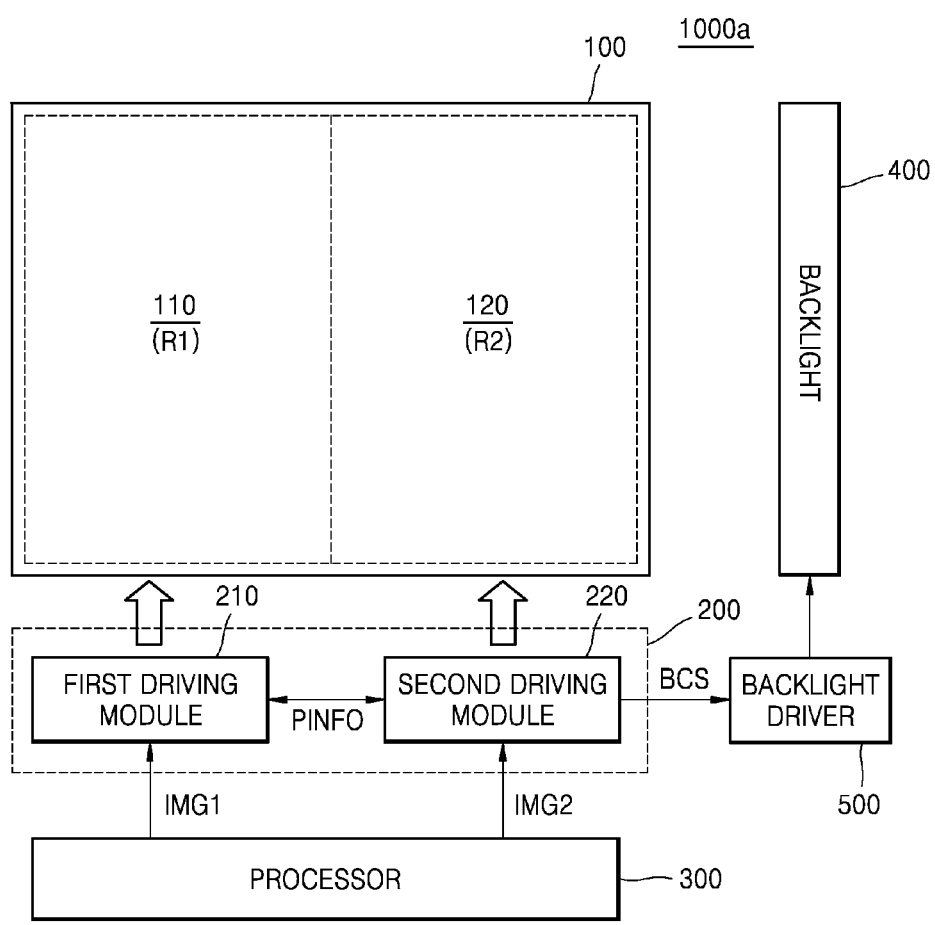
FIG. 3 is a block diagram illustrating an electronic device according to various embodiments of the present disclosure.

FIG. 3 is a block diagram illustrating an electronic device according to various embodiments of the present disclosure. Referring to FIG. 3, an electronic device 1000a (for example, the electronic device 1000) may include a display 100, a display driver 200, a processor 300, a backlight 400, and a backlight driver 500.

According to an embodiment, the backlight 400 and the backlight driver 500 may be added into the electronic device 1000 of FIG. 1. For example, when the display 100 is implemented with a liquid crystal panel, the liquid crystal panel cannot self-emit light and thus may receive light from the backlight 400 to operate.

According to an embodiment, the backlight 400 may be disposed adjacent to the display 100 and may supply the light to the display 100. The backlight 400 may include, for example, a plurality of optical devices (for example, a light-emitting diode (LED) or a cold cathode fluorescent lamp (CCFL)). The backlight 400 may turn on or off the optical devices, based on a driving signal or driving power (for example, a voltage, a current, or power) supplied from the backlight driver 500.

According to an embodiment, the backlight driver 500 may drive the backlight 400, based on a backlight control signal BCS supplied from the display driver 200. The backlight control signal BCS may be a signal which controls a luminance or an emission timing of the backlight 400. The backlight driver 500 may generate the driving signal or the driving power (for example, a voltage, a current, or power) supplied to the backlight 400, based on the control signal BCS.

According to an embodiment, the display driver 200 may include the first driving module 210 and the second driving module 220. The display driver 200 may drive the display 100 and may supply the backlight control signal BCS to the backlight driver 500. According to an embodiment, at least one of the first and second driving modules 210 and 220 may supply the backlight control signal BCS to the backlight driver 500. In addition, operations of the first and second driving modules 210 and 220 have been described above with reference to FIGS. 1 and 2, and thus, their detailed descriptions are not repeated.

Figure 4:
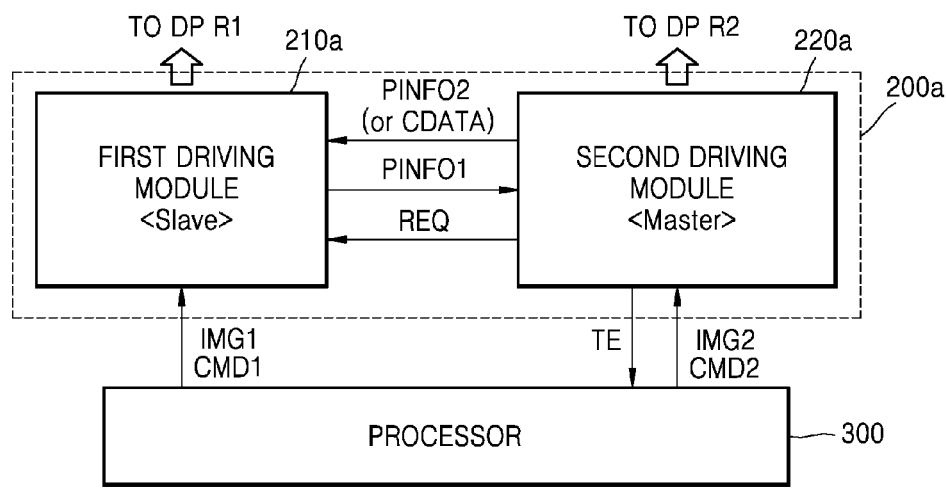
FIG. 4 is a block diagram illustrating an implementation example of a display driver according to various embodiments of the present disclosure.

FIG. 4 is a block diagram illustrating an implementation example of a display driver according to various embodiments of the present disclosure. The display driver 200a of FIG. 4 may be applied to the electronic devices of FIGS. 1 and 3. For convenience of description, the processor 300 is illustrated together.

Referring to FIG. 4, a display driver 200a (for example, the display driver 200) may include a first driving module 210a (for example, the first driving module 210) and a second driving module 220a (for example, the second driving module 220). According to an embodiment, one of the first and second driving modules 210a and 220a may be a master driving module for overall controlling the display of an image, and the other driving module may be a slave driving module controlled by the master driving module. In FIG. 4, for convenience of a description, additional information is described on the assumption that the second driving module 220a is the master driving module.

According to various embodiments, the first driving module 210a may receive, from the processor 300, at least one of the first image IMG1 and a first command CMD1. Also, the second driving module 220a may receive, from the processor 300, at least one of the second image IMG2 and a second command CMD2. According to an embodiment, for example, the first image IMG1 may be an image of a half frame, and the second image IMG2 may be an image of the other half frame. According to an embodiment, the first and second commands CMD1 and CMD2 may include a signal for setting display conditions (for example, gamma, luminance, brightness, chroma, contrast, sharpness, a color reproduction rate, a color, a display timing, and/or the like) of the first image IMG1 and the second image IMG2. For example, the first and second commands CMD1 and CMD2 may include a signal for setting a gamma curve and a luminance of an image or a timing when voltages corresponding to the image are applied to the display 100. For example, when the display condition of the first image IMG1 is the same as that of the second image IMG2, the first command CMD1 may have the same value as that of the second command CMD2.

According to various embodiments, the second driving module 220a may transfer a tearing effect control (TE) signal TE to the processor 300, for informing a state capable of receiving an image. For example, the TE signal TE may be a control signal for preventing image tearing or screen tearing from occurring because an image is transferred at an inappropriate timing and the image displayed by the display 100 is updated. According to an embodiment, the second driving module 220a may check a driving state of the first driving module 210a and a driving state of the second driving module 220a, and when a state capable of receiving an image is determined, the second driving module 220a may transfer the TE signal TE to the processor 300. The processor 300 may receive the TE signal TE and control a transfer timing of the first image IMG1 and a transfer timing of the second image IMG2 according to the received TE signal TE.

As described above with reference to FIGS. 1 and 2, the first driving module 210a (for example, the first driving module 210) and the second driving module 220a (for example, the second driving module 220) may perform image processing, share first and second processing information PINFO1 and PINFO2 or compensation data CDATA, and compensate for an image. According to an embodiment, the first driving module 210a may receive an information request signal REQ from the second driving module 220a, and in response to the information request signal REQ, the first driving module 210a may transfer the first processing information PINFO1 to the second driving module 220a.

As illustrated in FIG. 3, when the electronic device (for example, the electronic device 1000a) includes the backlight 400 and the backlight driver 500 (see FIG. 3), the second driving module 220a may adjust a luminance or a brightness of the backlight 400. According to an embodiment, the second driving module 220a may supply the backlight control signal BCS to the backlight driver 500.

According to an embodiment, the second driving module 220a may generate the backlight control signal BCS for controlling a duty ratio, a frequency, and/or the like of a driving signal generated by the backlight driver 500 or driving power (for example, a voltage, a current, power, and/or the like), based on a command for controlling a luminance of the backlight 400 among commands (for example, CMD2) received from the processor 300 and may supply the backlight control signal BCS to the backlight driver 500, thereby controlling a luminance of the backlight 400.

According to another embodiment, the second driving module 220a may process a frame image, based on the first processing information PINFO1 and the second image IMG2 received from the first driving module 210a and may generate the backlight control signal BCS based on a result of the processing to supply the backlight control signal BCS to the backlight driver 500, thereby controlling a luminance of the backlight 400. This will be described below in further detail with reference to FIGS. 7 to 9.

Figure 5:
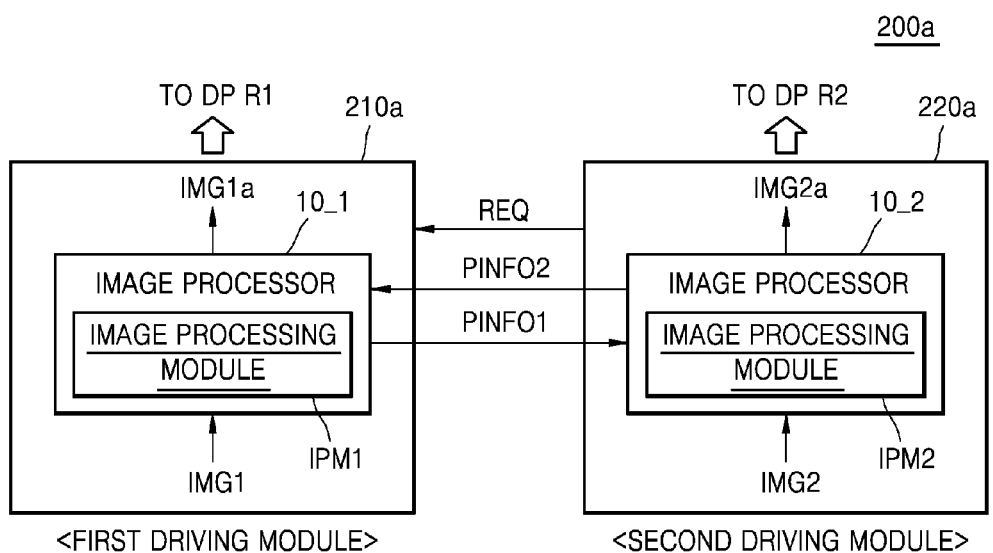
FIG. 5 is a block diagram illustrating an implementation example of a display driver according to various embodiments of the present disclosure.

FIG. 5 is a block diagram illustrating an implementation example of a display driver according to various embodiments of the present disclosure. Referring to FIG. 5, a first driving module 210a may include an image processor 10_1, and a second driving module 220a may include an image processor 10_2. Image processors 10_1 and 10_2 may respectively include image processing module IPM1 and image processing module IPM2 for performing image processing. Image processing module IPM1 and image processing module IPM2 may each include, for example, an image quality compensation function. Image processing module IPM1 and image processing module IPM2 may each include a digital nature image engine (DNIe™) that reproduces a natural image and improves image quality. However, this is merely an example, and the technical spirit of the present disclose is not limited thereto. Image processing module IPM1 and image processing module IPM2 may each include various image processing functions or image processing engines.

According to an embodiment, the image processor 10_1 of the first driving module 210a may compensate for the received first image IMG1 to generate a first compensation image IMG1a and may display the first compensation image IMG1a on the first region (R1) 110 of the display (100 in FIG. 4). According to an embodiment, the image processor 10_2 of the second driving module 220a may compensate for the received second image IMG2 to generate a second compensation image IMG2a and may display the second compensation image IMG2a on the first region (R2) 120 of the display 100.

According to various embodiments, the first driving module 210a and the second driving module 220a may receive a portion of an image of one frame (for example, a half frame) from a processor (for example, the processor 300).

According to an embodiment, in order to compensate for an image corresponding to the other driving module, at least one of the first and second driving modules 210a and 220a may need information about another image.

According to an embodiment, the first image processor 10_1 may receive, from the second image processor 10_2, information (for example, pixel data of a portion close to the first image IMG1, image quality compensation information, luminance, brightness, a histogram, gamma, a color temperature, a gray scale, linearity, a contrast ratio, a color reproduction rate, sharpness, a color, chroma, contrast, and/or the like) about the first image IMG1 among pixel data of the second image IMG2, for compensating for the first image IMG1.

According to an embodiment, the first and second image processors 10_1 and 10_2 may check information (for example, pixel data of a portion close to the second image IMG2, image quality compensation information, luminance, brightness, a histogram, gamma, a color temperature, a gray scale, linearity, a contrast ratio, a color reproduction rate, sharpness, a color, chroma, contrast, and/or the like) about the second image IMG2 among pixel data of the first image IMG1, for compensating for the second image IMG2.

According to an embodiment, the first driving module 210a may supply pixel data of a portion, which is close to the second image IMG2 among pixel data of the first image IMG1, to the second driving module 220a as first processing information PINFO1.

According to an embodiment, the second driving module 220a may compensate for the second image IMG2, based on the first processing information PINFO1.

On the other hand, according to an embodiment, the second driving module 220a may supply pixel data of a portion, which is close to the first image IMG1 among pixel data of the second image IMG2, to the first driving module 210a as second processing information PINFO2.

According to an embodiment, the first driving module 210a may compensate for the first image IMG1, based on the second processing information PINFO2. This will be described in detail with reference to FIG. 6.

Figure 6:
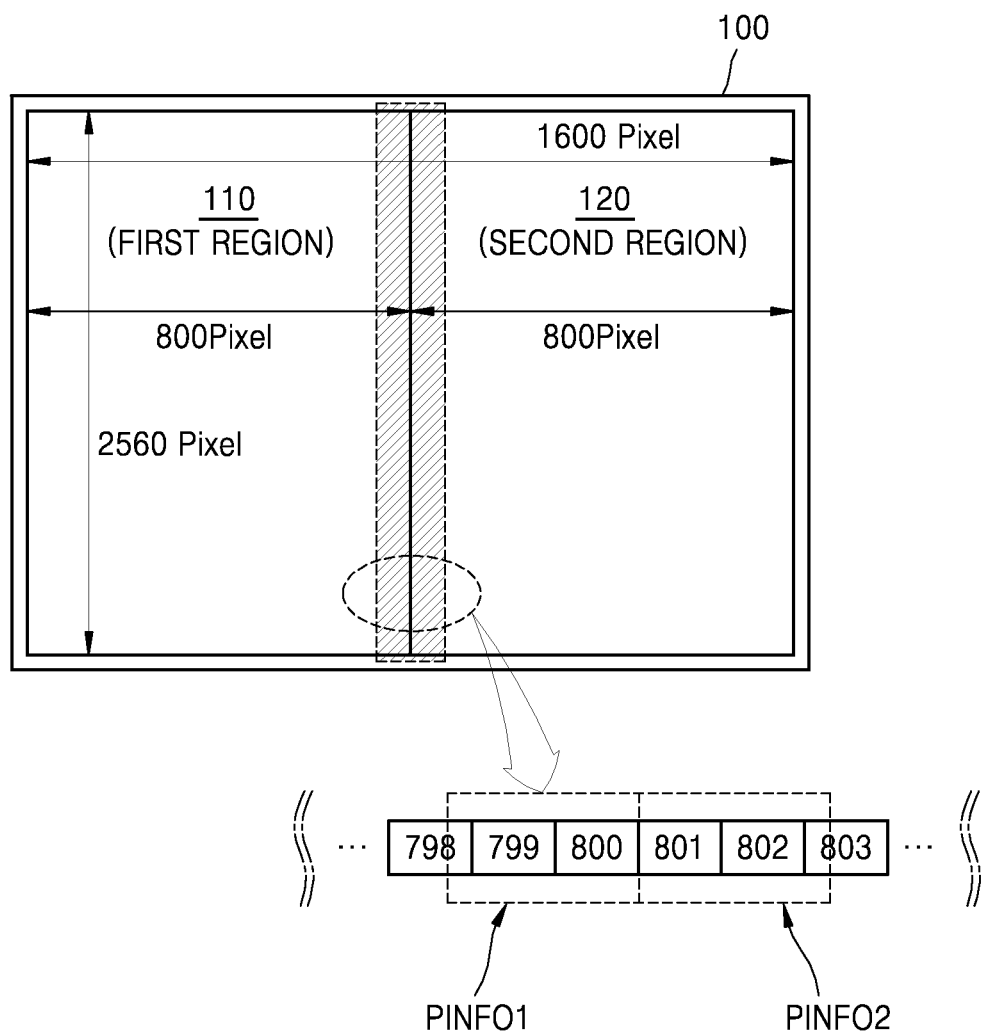
FIG. 6 is a diagram illustrating an example of processing information according to various embodiments of the present disclosure.

FIG. 6 is a diagram illustrating an example of processing information according to various embodiments of the present disclosure. Referring to FIG. 6, a resolution of a display 100 may be, for example, 1600*2560 pixel per inch (PPI).

According to an embodiment, a first region 110 and a second region 120 may include 800 pixels in a horizontal direction. For example, a resolution of each of a first image IMG1 and a second image IMG2 that are respectively displayed in the first region 110 and the second region 120 may be 800*2560 PPI.

According to an embodiment, the first driving module 210a or the second driving module 220a may generate, as first processing information PINFO1 or second processing information PINFO2, at least a portion of pixel data of a boundary portion (an obliquely-striped portion) of the first region 110 or the second region 120 and supply the generated information to the other driving module of the first and second driving modules 210a and 220a, respectively.

According to an embodiment, referring to the boundary portions (the obliquely-striped portions) of the first region 110 and the second region 120 which are enlarged and illustrated, for example, the first region 110 may include first to 800th pixels in the horizontal direction, and the second region 120 may include 801st to 1600th pixels.

According to an embodiment, in an image compensation operation (for example, an operation of compensating for image quality, luminance, brightness, a histogram, gamma, a color temperature, a gray scale, linearity, a contrast ratio, a color reproduction rate, sharpness, a color, chroma, contrast, and/or the like), image compensation may be performed based on a data value of a peripheral pixel, for compensating for an image for one pixel. In order to compensate for an image for the pixel data of the boundary portion of the first region 110 or the second region 120, pixel data of another region may be used.

According to an embodiment, the first driving module 210a may compensate for the pixel data of the boundary portion of the first region 110, based on the pixel data of the boundary portion of the second region 120 received from the second driving module 220a. The second driving module 220a may compensate for the pixel data of the boundary portion of the second region 120, based on the pixel data of the boundary portion of the first region 110 received from the first driving module 210a.

For example, in a case where pixel data values of two pixels adjacent to a pixel are used for compensating for pixel data of the pixel, in order to compensate for an image for an 800th pixel, the first driving module (210a in FIG. 5) may compensate for the image by using pixel data of a 798th pixel, a 799th pixel, an 801st pixel, or an 802nd pixel in addition to pixel data of the 800th pixel.

According to an embodiment, for example, in order to compensate for an image for the 801st pixel, the second driving module (220a in FIG. 5) may compensate for the image by using pixel data of the 799th pixel, the 800th pixel, the 802nd pixel, or an 803rd pixel in addition to pixel data of the 801st pixel.

According to various embodiments, the first image IMG1 received by the first driving module (210a in FIG. 5) may include, for example, pixel data of up to the 800th pixel, and the second image IMG2 received by the second driving module 220a may include, for example, pixel data of pixels subsequent to the 801st pixel.

According to an embodiment, for example, the first driving module 210a may transfer, as the first processing information PINFO1, pixel data of at least one of the 799th and 800th pixels to the second driving module 220a, and the second driving module 220a may transfer, as the second processing information PINFO2, pixel data of at least one of the 801st and 802nd pixels to the first driving module 210a.

According to an embodiment, the second driving module 220a may compensate for the second image IMG2, based on the first processing information PINFO1. According to another embodiment, the first driving module 210a may compensate for the first image IMG1, based on the second processing information PINFO2.

The image compensation method and the number of required pixels described above with reference to FIG. 6 are merely an example and may be variously modified. It is obvious to one of ordinary skill in the art that the first processing information PINFO1 and the second processing information PINFO2 may be variously modified.

Figure 7:
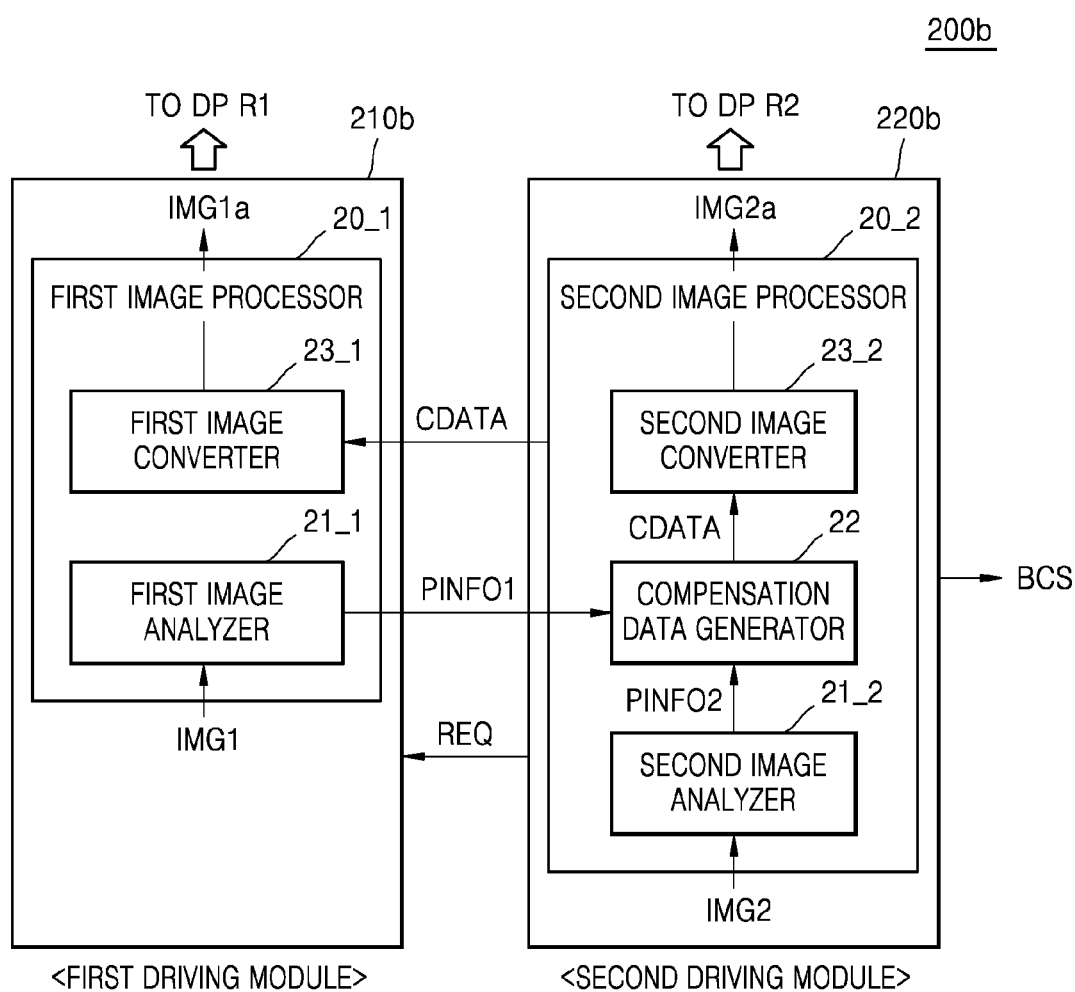
FIG. 7 is a block diagram illustrating an implementation example of a display driver according to various embodiments of the present disclosure.

FIG. 7 is a block diagram illustrating an implementation example of a display driver according to various embodiments of the present disclosure.

Referring to FIG. 7, a first driving module 210b (for example, the first driving module 210) of a display driver 200b (for example, the display driver 200) may include a first image processor 20_1, and a second driving module 220b (for example, the second driving module 220) of the display driver 200b may include a second image processor 20_2. The first image processor 20_1 or the second image processor 20_2 may compensate for an image by using various image quality compensation algorithms.

According to various embodiments, the first image processor 20_1 may analyze a first image IMG1 and compensate for the first image IMG1. To this end, the first image processor 20_1 may include at least one selected from a first image analyzer 21_1 and a first image converter 23_1.

According to an embodiment, the first image analyzer 21_1 may analyze the first image IMG1 to generate an analysis result as first processing information PINFO1. For example, the first processing information PINFO1 may include at least some of information such as a histogram, luminance, image quality processing information, brightness, gamma, a color temperature, a gray scale, linearity, a contrast ratio, a color reproduction rate, sharpness, a color, chroma, contrast, and/or the like of the first image IMG1. According to another embodiment, the first processing information PINFO1 may include information indicating whether the first image IMG1 is a moving image or a still image.

According to various embodiments, the first image analyzer 21_1 may supply the first processing information PINFO1 to the second driving module 220b in response to an information request signal REQ of the second driving module 220b.

The second image processor 20_2 may analyze a second image IMG2 or a whole frame image and compensate for at least one selected from the first image IMG1 and the second image IMG2. To this end, the second image processor 20_2 may include a second image analyzer 21_2, a compensation data generator 22, or a second image converter 23_2.

According to an embodiment, the second image analyzer 21_2 may analyze the second image IMG2 to generate an analysis result as second processing information PINFO2. The second processing information PINFO2 may include information of the same or similar kind as the first processing information PINFO1.

According to an embodiment, the compensation data generator 22 may analyze at least one of the first and second images IMG1 and IMG2 to generate compensation data CDATA for at least one of the first and second images IMG1 and IMG2, based on the first processing information PINFO1 received from the first driving module 210 or the second processing information PINFO2 generated by the second image analyzer 21_2. For example, the compensation data CDATA may include an image scale value (for example, a scaling factor) for scaling levels of pixel data values (for example, a value representing a gray scale of a pixel) of pixels included in an image and gamma compensation data for controlling a gamma curve of the first image IMG1 or the second image IMG2.

According to various embodiments, the compensation data CDATA for at least one of the first and second images IMG1 and IMG2 may be supplied to at least one selected from the first image converter 23_1 of the first driving module 210 and the second image converter 23_2 of the second driving module 220. At least one selected from the first image converter 23_1 and the second image converter 23_2 may compensate for at least one of the first and second images IMG1 and IMG2, based on the compensation data CDATA. For example, at least one selected from the first image converter 23_1 and the second image converter 23_2 may scale a pixel data value of at least one of the first and second images IMG1 and IMG2 (when the compensation data CDATA is a scaling factor of 50%, control '11111111', which is a pixel data value representing a 256 gray scale, to '01111111' which is a pixel data value representing a 128 gray scale) or control a gamma curve of the first image IMG1 or the second image IMG2, based on the compensation data CDATA. In addition, various compensation methods (for example, compensating for image quality, luminance, brightness, a histogram, gamma, a color temperature, a gray scale, linearity, a contrast ratio, a color reproduction rate, sharpness, a color, chroma, contrast, and/or the like) may be applied based on the kind of the compensation data CDATA.

According to an embodiment, the compensation data CDATA for the first and second images IMG1 and IMG2 may be supplied to the first image converter 23_1 of the first driving module 210 and the second image converter 23_2 of the second driving module 220. The first image converter 23_1 may compensate for the first image IMG1, based on the compensation data CDATA. The second image converter 23_2 may compensate for the second image IMG2, based on the compensation data CDATA.

According to an embodiment, the compensation data CDATA for at least one of the first and second images IMG1 and IMG2 may be supplied to the second image converter 23_2 of the second driving module 220. The second image converter 23_2 may compensate for at least one of the first and second images IMG1 and IMG2, based on the compensation data CDATA.

According to an embodiment, the compensation data CDATA for the first image IMG1 may be supplied to the first image converter 23_1 of the first driving module 210. The first image converter 23_1 may compensate for the first image IMG1, based on the compensation data CDATA.

According to an embodiment, the compensation data CDATA for the first image IMG1 may be supplied to the second image converter 23_2 of the second driving module 220. The second image converter 23_2 may compensate for the first image IMG1, based on the compensation data CDATA.

According to an embodiment, the compensation data CDATA for the second image IMG2 may be supplied to the second image converter 23_2. The second image converter 23_2 may compensate for the second image IMG2, based on the compensation data CDATA.

According to various embodiments, when the display driver 200b of FIG. 7 is applied to an electronic device including a backlight (for example, the backlight 400) like the electronic device of FIG. 3, the second driving module 220b may generate and output a backlight control signal BCS for controlling the backlight 400. A luminance of the backlight 400 may be controlled based on a processing result of a whole frame image that includes the first image IMG1 and the second image IMG2.

According to an embodiment, a luminance of an image displayed by the display may be determined based on at least one selected from pixel data (for example, pixel data associated with a color, brightness, a color temperature, chroma, a gray scale, and/or the like) and the luminance of the backlight 400. In this case, in order to reduce consumption power, the display driver 200b may dynamically control the luminance of the backlight 400 according to the kind of an image (for example, a moving image or a still image) or a brightness of the image and may control a pixel data value of the image, based on the controlled luminance.

According to an embodiment, in order to compensate for image quality, the display driver 200b may control the luminance of the backlight 400, based on a luminance of an image and control a pixel data value or a gamma curve of the image, based on the luminance of the backlight 400.

According to an embodiment, the compensation data generator 22 of the second driving module 220b may generate the backlight control signal BCS, based on an analysis result of a whole frame image. The backlight driver 500 may control a duty ratio, a frequency, and/or the like of a driving signal or driving power (for example, a voltage, a current, power, and/or the like), based on the backlight control signal BCS. When the duty ratio or frequency of the driving signal or the driving power is varied, the luminance of the backlight 400 may be varied. The compensation data generator 22 may generate the compensation data CDATA, based on the varied luminance of the backlight 400. The compensation data CDATA may include gamma compensation data for controlling a gamma curve of a frame image, luminance compensation data for controlling a luminance of the frame image, or an image scale value for scaling levels of data values of pixels included in the frame image.

Hereinafter, a case where the display driver 200b executes a dynamic backlight control (DBLC) algorithm for a pentile type display will be described as an example. First, the pentile type display will be described in detail with reference to FIGS. 8 A and 8B.

Figure 8A:
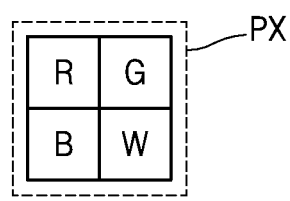
FIGS. 8A and 8B are diagrams illustrating a pixel array of a pentile type display according to various embodiments of the present disclosure.
Figure 8B:
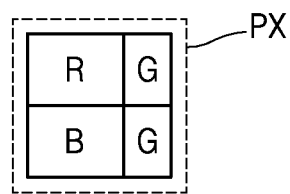

FIGS. 8A and 8B are diagrams illustrating a pixel array of a pentile type display according to various embodiments of the present disclosure. The pentile type display may include a plurality of pixels that are arranged in a pentile type. For example, an arrangement type of the pixels may include a real stripe type, an RGB stripe type, or the pentile type. According to an embodiment, in the real stripe type, one pixel PX may include, for example, three sub-pixels respectively having red (R), green (G), and blue (B).

According to an embodiment, in the pentile type, one pixel may include four sub-pixels. According to an embodiment, as illustrated in FIG. 8A, the one pixel may include a red (R) sub-pixel, a green (G) sub-pixel, a blue (B) sub-pixel, and a white (W) sub-pixel. Such an arrangement type may be referred to as an RGBW pentile type. According to an embodiment, a cell size of the white (W) sub-pixel may be smaller than those of the red (R) sub-pixel, the green (G) sub-pixel, and the blue (B) sub-pixel. The white (W) sub-pixel is a transparent sub-pixel that does not include a color filter, and may be high in transmittance of light. An RGBW pentile type display may display a high-luminance image.

According to another embodiment, as illustrated in FIG. 8B, one pixel may include a red (R) sub-pixel, a blue (B) sub-pixel, and two green (G) sub-pixels. Such an arrangement type may be referred to as an RGBG pentile type. According to an embodiment, a size of each of the red (R) sub-pixel and the blue (B) sub-pixel may be larger than that of the green (G) sub-pixel. According to an embodiment, a size of each of the red (R) sub-pixel and the blue (B) sub-pixel may be two times a size of the green (G) sub-pixel. The green (G) sub-pixel may be brighter felt than the red (R) sub-pixel and the blue (B) sub-pixel. An RGBG pentile type display may display a high-luminance image.

Referring again to FIG. 7, according to an embodiment, a display (for example, the display 100) may include a pentile type display. When an image received from the processor 300 includes, for example, pixel data corresponding to the real stripe type, a display driver 200b may modify the pixel data to correspond to the pentile type. The display driver 200b may control a luminance of the backlight 400 and scale a pixel data value, for displaying an image having the same image quality as that of an original image or displaying an image with improved image quality. The luminance of the backlight 400 may be varied based on a luminance of an image.

According to an embodiment, when a frame image to be displayed by the display 100 is a high-luminance image, the luminance of the backlight 400 may increase, and when the frame image is a low-luminance image, the luminance of the backlight 400 may be lowered. A pixel data value that is obtained through modification based on the pentile type may be scaled based on the luminance of the backlight 400.

According to another embodiment, a gain of an image may increase, and the luminance of the backlight 400 may be lowered.

According to an embodiment, the first image analyzer 21_1 may modify pixel data of the first image IMG1 to correspond to an arrangement (for example, the pentile type) of the pixels of the display and may analyze a histogram of the modified first image. An analysis result may be generated as the first processing information PINFO1 and may be supplied to the second driving module 220b. The second image analyzer 21_2 may modify pixel data of the second image IMG2 to correspond to an arrangement (for example, the pentile type) of the pixels of the display, analyze a histogram of the modified second image, and generate a result of the analysis as the second processing information PINFO2.

According to an embodiment, the compensation data generator 22 may analyze a histogram of a whole frame image by using the first processing information PINFO1 and the second processing information PINFO2 and generate at least one selected from the compensation data CDATA and the backlight control signal BCS, based on a result of the analysis. According to an embodiment, the backlight control signal BCS may be supplied to a backlight driver (for example, the backlight driver 500), and the backlight driver 500 may control the luminance of the backlight 400 according to the backlight control signal BCS. The compensation data CDATA may include, for example, a scaling factor for gamma compensation data, luminance compensation data, or pixel data. For example, the compensation data CDATA may be supplied to at least one selected from the first image converter 23_1 of the first driving module 210b and the second image converter 23_2.

According to an embodiment, the first image converter 23_1 and the second image converter 23_2 may compensate for a gamma and a luminance of the modified first image and a gamma and a luminance of the modified second image, based on the compensation data CDATA or may scale a pixel data value, thereby compensating for the modified first image and the modified second image.

As another example, a case where the display driver 200b executes a contents adaptive backlight control (CABC) algorithm will be described. According to the CABC algorithm, the display driver 200b may control a gamma curve of pixel data of an image according to the image and control the luminance of the backlight 400 to display an image having brightness which is visually similar to that of an original image, thereby decreasing consumption power.

For example, in displaying a dark image, the luminance of the backlight 400 may be lowered, and a gamma curve of the dark image may increase. A curve, which shows, as a rate, luminance values (or voltage values) that are measured for each gray scale of pixel data, may be referred to as a gamma curve. When the CABC algorithm is applied, a pixel data value of a gamma-controlled image may be output as a higher luminance value than a luminance value for each gray scale that is represented by a pixel data value of the original image. Therefore, despite the luminance of the backlight 400 being lowered, an image having brightness that is visually similar to that of an original image is obtained.

On the other hand, in displaying a bright image, the luminance of the backlight 400 may increase, and a gamma curve of the bright image may be reduced. The pixel data value of the gamma-controlled image may be output as a higher luminance value than the luminance value for each gray scale that is represented by the pixel data value of the original image. Therefore, even when the luminance of the backlight increases, an image having brightness that is visually similar to that of an original image is obtained.

In FIG. 7, according to an embodiment, the first image analyzer 21_1 may analyze a histogram of the first image IMG1 to generate an analysis result as the first processing information PINFO1, and the second image analyzer 21_2 may analyze a histogram of the second image IMG2 to generate an analysis result as the second processing information PINFO2. The first driving module 210b may supply the first processing information PINFO1 to the second driving module 220b in response to the information request signal REQ. The compensation data generator 22 may analyze a histogram or a luminance of a whole frame image, based on the first processing information PINFO1 and the second processing information PINFO2. The compensation data generator 22 may generate the backlight control signal BCS for controlling the luminance of the backlight 400 or the compensation data CDATA for compensating for an image, based on a result of the analysis. According to an embodiment, the compensation data CDATA may be a gamma setting signal for controlling a gamma curve of an image.

The compensation data CDATA (e.g., the gamma setting signal) may be supplied to the first image converter 23_1 of the first driving module 210a and the second image converter 23_2. The first image converter 23_1 or the second image converter 23_2 may change a gamma curve, based on the gamma setting signal. For example, the first image converter 23_1 or the second image converter 23_2 may include a gamma voltage generation circuit. The first image converter 23_1 or the second image converter 23_2 may control voltage levels of grayscale voltages to control gamma curves of the first and second images IMG1 and IMG2, based on the gamma setting signal.

As described above, according to an embodiment, the plurality of driving modules (for example, the first and second driving modules 210a and 220a) included in the display driver 200b of FIG. 7 may execute an image quality compensation algorithm and transmit or receive information (for example, image quality compensation algorithm information) about an image, whereby the image quality compensation algorithm may be executed in consideration of another image as well as an image corresponding to each of the plurality of driving modules (for example, the first and second driving modules 210a and 220a).

According to an embodiment, one driving module (for example, the second driving module 220b) may receive information (for example, image quality compensation algorithm information) about an image from the first driving module 210b, analyze a whole frame image including the first image IMG1 and the second image IMG2, and control the luminance of the backlight 400 based on a result of the analysis or generate the compensation data CDATA for compensating for the image, thereby controlling the image compensation of at least one of the first and second images IMG1 and IMG2.

Figure 9:
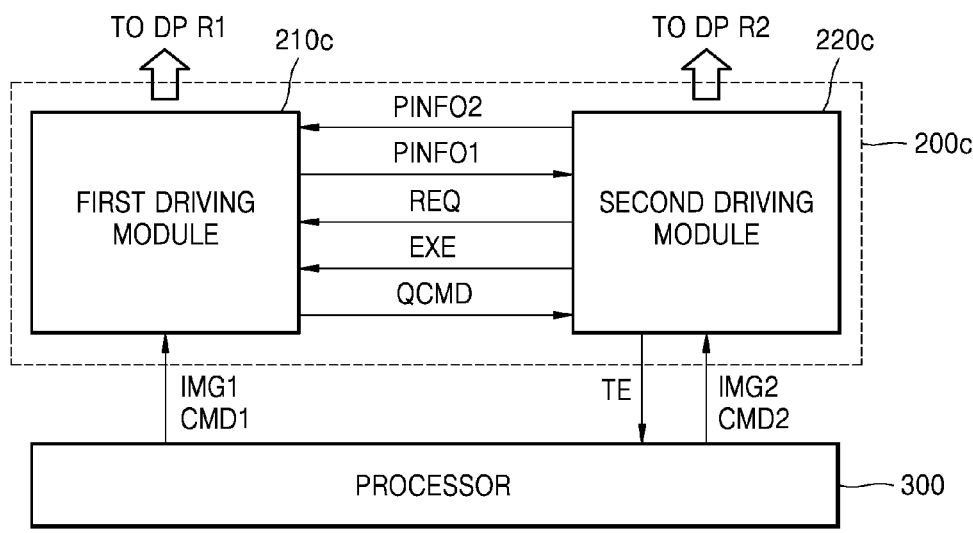
FIG. 9 is a block diagram illustrating an implementation example of a display driver according to various embodiments of the present disclosure.

FIG. 9 is a block diagram illustrating an implementation example of a display driver according to various embodiments of the present disclosure. For convenience of a description, the processor 300 is illustrated together.

Referring to FIG. 9, a display driver 200c (for example, the display driver 200) may include a first driving module 210c (for example, the first driving module 210) and a second driving module 220c (for example, the second driving module 220). According to an embodiment, the first driving module 210c may receive a first image IMG1 and a first command CMD1 from the processor 300. The second driving module 220c may receive a second image IMG2 and a second command CMD2 from the processor 300. The second driving module 220c may check states of the first and second driving modules 210c and 220c, and when the first and second driving modules 210c and 220c are in a state capable of receiving an image, the second driving module 220c may transfer a synchronization signal (e.g., a TE signal TE), which indicates the state, to the processor 300. For example, the second driving module 220c may receive information about an operation state from the first driving module 210c and check a state of the first driving module 210c, based on the received information. Also, the second driving module 220c may check an internal operation state.

The first driving module 210c according to an embodiment may transfer, to the second driving module 220c, a reception check signal QCMD which indicates that the first command CMD1 has been received from the processor 300, and the second driving module 220c may transfer, to the first driving module 210c, an execution signal EXE that instructs application of a command. When a reception check signal QCMD is received from the first driving module 210c and the second command CMD2 is received from the processor 300, the second driving module 220c may generate the execution signal EXE. For example, when it is determined that all the first and second driving modules 210c and 220c have received respective commands, the second driving module 220c may generate the execution signal EXE.

According to an embodiment, when the second command CMD2 is received from the processor 300, the second driving module 220c may generate the execution signal EXE. For example, the processor 300 may transfer the first command CMD1 to the first driving module 210c and then transfer the second command CMD2 to the second driving module 220c. In this case, when the processor 300 transfers the second command CMD2 to the second driving module 220c, the second driving module 220c may estimate that the first command CMD1 has been already transferred to the first driving module 210c, the second driving module 220c may generate the execution signal EXE.

According to an embodiment, in response to the execution signal EXE, the first driving module 210c or the second driving module 220c may respectively execute the first command CMD1 or the second command CMD2 received from the processor 300. As described above with reference to FIG. 4, the first and second commands CMD1 and CMD2 may include a signal for setting display conditions, such as a gamma curve, a luminance, etc. of an image, of the first image IMG1 and the second image IMG2.

According to an embodiment, the first command CMD1 may be stored in a register (not shown) included in the first driving module 210c and may be set as a condition (for example, gamma, luminance, brightness, chroma, a contrast ratio, sharpness, a color reproduction rate, a color, contrast, a display timing, and/or the like) where the first image IMG1 is displayed. The second command CMD2 may be stored in a register (not shown) included in the second driving module 220c and may be set as a condition where the second image IMG2 is displayed. In addition, operations of the first and second driving modules 210c and 220c are similar to those of the first and second driving modules 210a and 220a of FIG. 4, and thus, repetitive descriptions are not repeated.

Figure 10:
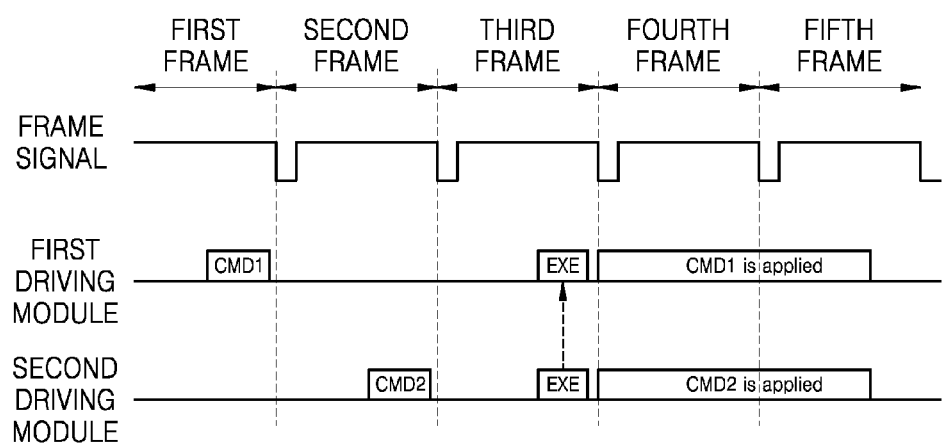
FIG. 10 is a timing diagram for describing a command being applied to the display driver of FIG. 9 various embodiments of the present disclosure.

FIG. 10 is a timing diagram for describing a command being applied to the display driver of FIG. 9 according to an embodiment of the present disclosure.

Referring to FIG. 10, a first command CMD1 and a second command CMD2 may be supplied at different times. According to an embodiment, the first command CMD1 and the second command CMD2 may be transferred during different frame periods. A second driving module (220c in FIG. 9) may check that the first command CMD1 has been received by the first driving module 210c or check that the second command CMD2 has been received from a processor (for example, the processor 300), and may generate an execution signal EXE.

According to an embodiment, the second driving module (220c in FIG. 9) may supply the execution signal EXE to the first driving module 210c. In response to the execution signal EXE, the first driving module 210c or the second driving module 220c may respectively execute the first command CMD1 or the second command CMD2 received from the processor (for example, the processor 300). A display condition (for example, gamma, luminance, brightness, chroma, a contrast ratio, sharpness, a color reproduction rate, a color, contrast, a display timing, and/or the like) based on the first command CMD1 or the second command CMD2 may be applied to the first and second images IMG1 and IMG2 from a next frame period (e.g., a fourth frame period).

According to an embodiment, when the first command CMD1 and the second command CMD2 are respectively received and are immediately executed by the first driving module 210c and the second driving module 220c, a period where the first command CMD1 is applied may differ from a period where the second command CMD2 is applied. For example, when the first driving module receives and executes the first command CMD1 during a first frame period and the second driving module receives and executes the second command CMD2 during a second frame period, the first command CMD1 may be applied during the second frame period, and the second command CMD2 may be applied during a third frame period. In this case, during the second frame period, a display condition for the first image IMG1 may differ from a display condition for the second image IMG2, and a time difference may occur between the first image IMG1 and the second image IMG2 displayed by a display (for example, the display 100).

The display driver (for example, the display driver 200c) according to an embodiment described above with reference to FIG. 9 may execute the first image IMG1 or the second image IMG2 in response to the execution signal EXE, and thus, the first command CMD1 and the second command CMD2 may be applied from the same frame period, thereby preventing an image quality difference from occurring between the first image IMG1 and the second image IMG2.

Figure 11:
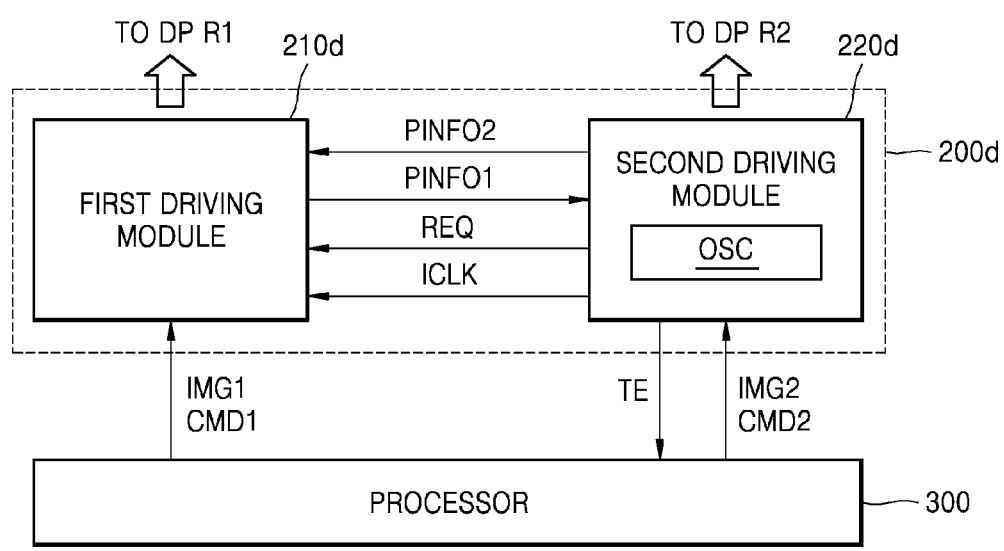
FIG. 11 is a block diagram illustrating an implementation example of a display driver according to various embodiments of the present disclosure.

FIG. 11 is a block diagram illustrating an implementation example of a display driver 200d according to various embodiments of the present disclosure. For convenience of a description, the processor 300 is illustrated together.

An operation of the display driver 200d of FIG. 11 is similar to the above-described operations of the display drivers 200a, 220b and 200c. An image processing and compensating method performed by first and second driving modules 210d and 220d has been described above, and thus, repetitive descriptions are not repeated.

In the display driver 200d according to various embodiments, the second driving module 220d may include a clock generator OSC and may generate an internal clock ICLK. The second driving module 220d may transfer the internal clock ICLK to the first driving module 210d. According to an embodiment, at least one of the first and second driving modules 210d and 220d may divide the internal clock ICLK and use the divided clock as a clock signal for display. A frame synchronization signal (for example, a vertical synchronization signal) or a line synchronization signal (for example, a horizontal synchronization signal) may be generated based on the internal clock ICLK.

According to an embodiment, the second driving module 220d may generate the internal clock ICLK in a certain operation mode. The certain operation mode (for example, a panel self refresh (PSR) mode or a command mode) may be an operation mode where a driving module internally generates a synchronization signal (for example, the vertical synchronization signal, the horizontal synchronization signal, and/or the like). According to an embodiment, in the PSR mode, when an image displayed by a display is a still image (for example, when the same images are continuously input to the display driver), the processor 300 may block transmission of data to the display driver 200d (for example, the display driver 200), or the display driver 200d may issue a request to stop transmission of data to the processor 300, whereby the operation mode may be performed. The display driver 200d may continuously display the still image that is stored in an internal memory.

According to various embodiments, a command mode may be one of operation modes that are supported by a mobile display digital interface (MDDI). The command mode may be an operation mode where the processor 300 transfers an image to the display driver 200d in response to a TE signal TE from the display driver 200d, and the display driver 200d generates a synchronization signal based on the internal clock ICLK to display the image.

In the certain operation mode, the processor 300 may not supply a clock for display to a plurality of the driving modules 210d and 220d. However, one (for example, the second driving module 220d) of the plurality of driving modules 210d and 220d may generate the internal clock ICLK and supply the internal clock ICLK to the other driving module (for example, the first driving module 210d), whereby the plurality of driving modules 210d and 220d may be synchronized with each other and may operate.

Figure 12:
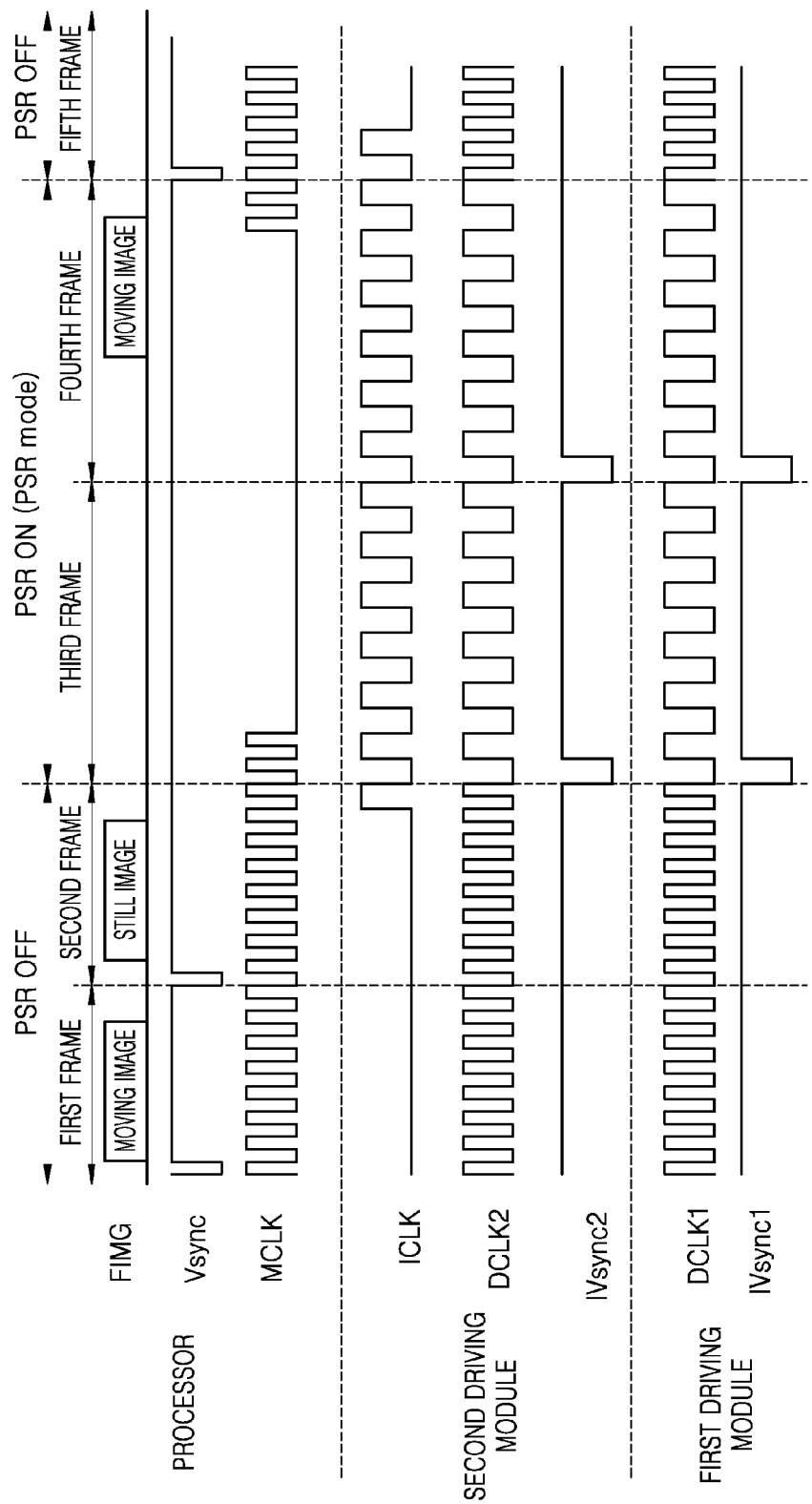
FIG. 12 is a timing diagram showing timings of signals when a panel self refresh function is applied to an electronic device according to various embodiments of the present disclosure.

FIG. 12 is a timing diagram showing timings of signals when a panel self refresh function is applied to an electronic device according to various embodiments of the present disclosure.

According to an embodiment, a PSR function may be a function where a processor (for example, the processor 300) determines whether an image displayed by a display is a moving image or a still image.

According to an embodiment, when an image is a moving image, the processor (for example, the processor 300) may periodically or continuously transfer the image to the display driver 200d.

According to an embodiment, when an image is a still image, the processor (for example, the processor 300) may transfer the image to the display driver 200d and then pause the transfer of a frame image FIMG and a main clock MCLK until before the image is converted into a moving image.

The display driver 200d may continuously access an image that is stored in the internal memory, and display the image in the display. In the PSR mode, the processor 300 may pause the transfer of data to the display driver 200d, thereby decreasing consumption power.

Referring to FIG. 12, the processor (for example, the processor 300) may transfer the frame image FIMG, a vertical synchronization signal Vsync, and the main clock MCLK to the plurality of driving modules (for example, the first driving module 210d or the second driving module 220d) of the display driver 200d. According to an embodiment, the frame image FIMG and the vertical synchronization signal Vsync may be transferred as, for example, packet data. The main clock MCLK may be added (embedded) into the packet data and transferred.

According to an embodiment, the frame image FIMG may be divided into a first image IMG1 and a second IMG2, which may be respectively supplied to the first driving module 210d and the second driving module 220d. In this case, the frame image FIMG may include at least a portion of a moving image or a still image.

According to various embodiments, in a still image display period, an electronic device may operate in the PSR mode. According to an embodiment, the processor 300 may transfer a still image and then, until before an image is converted into a moving image, the processor 300 may not transfer at least one selected from the frame image FIMG and a command (for example, the first command CMD1 or the second command CMD2) to the first driving module 210d and the second driving module 220d. According to another embodiment, the processor 300 may transfer a still image and then, until before an image is converted into a moving image, the processor 300 may not transfer any signal to the first driving module 210d and the second driving module 220d.

When an image to be displayed by the display (for example, the display 100) is converted into a moving image, the processor 300 may again transfer the frame image FIMG (for example, a moving image), a command, and other signals (for example, the vertical synchronization signal Vsync and the main clock MCLK).

In a period (for example, a first frame period and a second frame period) where a moving image is displayed, the first driving module 210d or the second driving module 220d may display a moving image in the display (for example, the display 100) in synchronization with the vertical synchronization signal Vsync by using the main clock MCLK, received from the processor 300, as display clocks DCLK1 and DCLK2.

In a period (for example, a third frame period and a fourth frame period) where a still image is displayed, the electronic device may operate in the PSR mode. The driving module of at least one of the first and second driving modules 210d and 220d may generate the internal clock ICLK, and the first driving module 210d and the second driving module 220d may display a still image or a moving image in the display (for example, the display 100) by using the internal clock ICLK as the display clocks DCLK1 and DCLK2.

For example, the second driving module 220d which is a master driving module may generate the internal clock ICLK and transfer the internal clock ICLK to the first driving module 210d. In FIG. 12, it is illustrated that a frequency of the internal clock ICLK differs from that of the main clock MCLK, but the present embodiment is not limited thereto. The frequency of the internal clock ICLK may be the same as that of the main clock MCLK, and the internal clock ICLK may include a frequency of various ranges.

According to an embodiment, the first driving module 210d or the second driving module 220d may use the internal clock ICLK as the display clock CLK2. Also, the first and second driving modules 210d and 220d may respectively generate internal vertical synchronization signals IVsync1 and IVsync2 by using the internal clock ICLK.

According to another embodiment, the second driving module 220d may supply the internal clock ICLK or the internal vertical synchronization signal IVsync2 to the first driving module 210d. The first driving module 210d may display a still image or a moving image in the display (for example, the display 100) by using the internal vertical synchronization signal IVsync2.

According to an embodiment, a moving image may be received from the processor 300. In this case, the first driving module 210d or the second driving module 220d may display the moving image by using the main clock MCLK or the vertical synchronization signal Vsync received from the processor 300. At this time, the second driving module 220d may pause generation of the internal clock ICLK.

Figure 13:
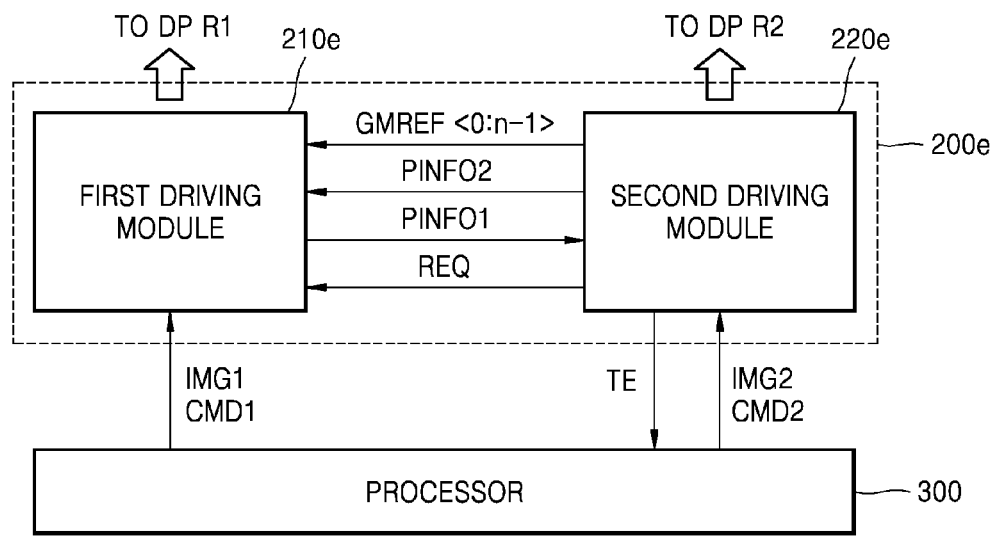
FIG. 13 is a block diagram illustrating an implementation example of a display driver according to various embodiments of the present disclosure.
Figure 14:
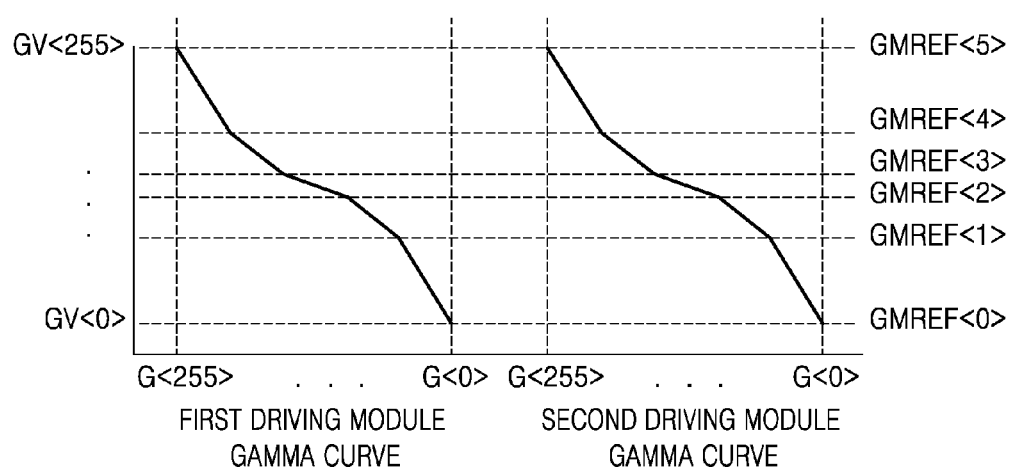
FIG. 14 is a diagram showing gamma curves of first and second driving modules in the display driver of FIG. 13 according to various embodiments of the present disclosure.

FIG. 13 is a block diagram illustrating an implementation example of a display driver 200e according to various embodiments of the present disclosure. FIG. 14 is a diagram showing gamma curves of first and second driving modules in the display driver of FIG. 13 according to various embodiments of the present disclosure.

An operation of the display driver 200e (for example, the display driver 200) of FIG. 13 is similar to the above-described operations of the display drivers 200 and 200a to 220d. An image processing and compensating method performed by a first driving module 210e (for example, the first driving module 210) and a second driving module 220e (for example, the second driving module 220) has been described above, and thus, repetitive descriptions are not repeated.

According to various embodiments, in the display driver 200e, the second driving module 220e may generate a plurality of gamma reference voltages GMREF<0:n−1>. The gamma reference voltages GMREF<0:n−1> may be at least one selected from a start point, an end point, and an inflection point of a gamma curve among a plurality of grayscale voltages GV<0:255> shown in FIG. 14. The second driving module 220e may supply the gamma reference voltages GMREF<0:n−1> to the first driving module 210e. The first driving module 210e or the second driving module 220e may voltage-divide the gamma reference voltages GMREF<0:n−1> to generate the grayscale voltages GV<0:255>.

According to an embodiment, the form of the gamma curve may be changed by the gamma reference voltages GMREF<0:n−1>. The gamma reference voltages GMREF<0:n−1> may be generated based on a gamma setting value received from the processor 300. According to an embodiment, the first driving module 210e or the second driving module 220e may generate the gamma reference voltages GMREF<0:n−1>, based on the same gamma setting value. Furthermore, the gamma reference voltages GMREF<0:n−1> may have different voltage levels due to the offset or image processing (for example, image quality compensation, luminance, brightness, a histogram, gamma, a color temperature, a gray scale, linearity, a contrast ratio, a color reproduction rate, sharpness, a color, chroma, contrast, and/or the like) of an internal circuit (for example, a resistor, an amplifier, a regulator, or the like). In this case, the first driving module 210e or the second driving module 220e may generate the grayscale voltages GV<0:255> by using information associated with the gamma reference voltages GMREF<0:n−1>, for example, at least one selected from first processing information PINFO1 and second processing information PINFO2, and may have a gamma curve having the same or similar form.

Figure 15:
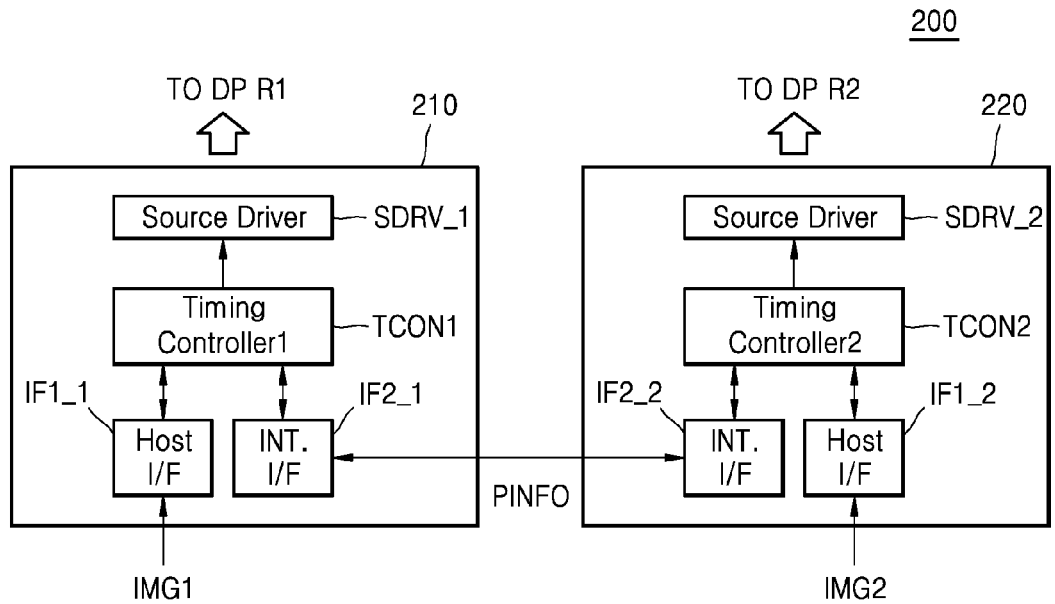
FIG. 15 is a block diagram illustrating an example of a driving module included in a display driver according to various embodiments of the present disclosure.

FIG. 15 is a block diagram illustrating an example of a driving module included in a display driver according to various embodiments of the present disclosure.

Referring to FIG. 15, a first driving module 210 may include a host interface IF1_1, an internal interface IF2_1, a timing controller TCON1, and a source driver SDRV_1, and a second driving module 220 may include a host interface IF1_2, an internal interface IF2_2, a timing controller TCON2, and a source driver SDRV_2. According to an embodiment, each of the first and second driving modules 210 and 220 may further include a gate driver (not shown).

The host interfaces IF1_1 and IF1_2 may transmit or receive a signal to or from a processor (300 in FIG. 1). Each of the host interfaces IF1_1 and IF1_2 may include, for example, one selected from an RGB interface, a central processing unit (CPU) interface, a serial interface, an MDDI, an inter integrated circuit (I2C) interface, a serial peripheral interface (SPI), a micro controller unit (MCU) interface, a mobile industry processor interface (MIPI), an embedded display port (eDP) interface, or a high definition multimedia interface (HDMI).

According to an embodiment, the host interface IF1_1 of the first driving module 210 may receive a first image IMG1 and a first command CMD1 from the processor 300. The host interface IF1_2 of the second driving module 220 may receive a second image IMG2 and a second command CMD2 from the processor 300. According to an embodiment, when the second driving module 220 is a master driving module, the host interface IF1_2 of the second driving module 220 may transmit, to the processor (for example, the processor 300), a TE signal (not shown) for informing a state capable of receiving an image.

According to an embodiment, the internal interfaces IF2_1 and IF2_2 may transmit or receive a signal between the first driving module 210 and the second driving module 220. For example, the internal interfaces IF2_1 and IF2_2 may transmit or receive first processing information PINFO1, second processing information PINFO2, or compensation data CDATA. Each of the internal interfaces IF2_1 and IF2_2 may include a serial interface (for example, an SPI, an I2C interface, or the like).

According to an embodiment, the timing controllers TCON1 and TCON2 may receive, from the processor, at least one selected from the first and second images IMG1 and IMG2 and signals (for example, a command, a main clock, a vertical synchronization signal, etc.), and generate a control signal for controlling the source drivers SDRV1 and SDRV2, based on the received signals. According to an embodiment, the timing controller TCON1 may include an image processor (for example, the image processor 10_1) and process the received first image IMG1, and the timing controller TCON2 may include an image processor (for example, the image processor 10_2) and process the received second image IMG2. According to an embodiment, each of the image processors may be implemented as a separate module indifferently from the timing controllers TCON1 and TCON2.

According to an embodiment, the timing controller TCON2 of the second driving module 220 may generate the TE signal.

According to an embodiment, the source drivers SDRV1 and SDRV2 may supply signals for displaying an image in a display (for example, the display 100) according to the control signal supplied from the timing controllers TCON1 and TCON2, respectively. The source drivers SDRV1 and SDRV2 may generate a plurality of grayscale voltages and output grayscale voltages, corresponding to the processed first and second images IMG1 and IMG2, to the display.

Figure 16A:
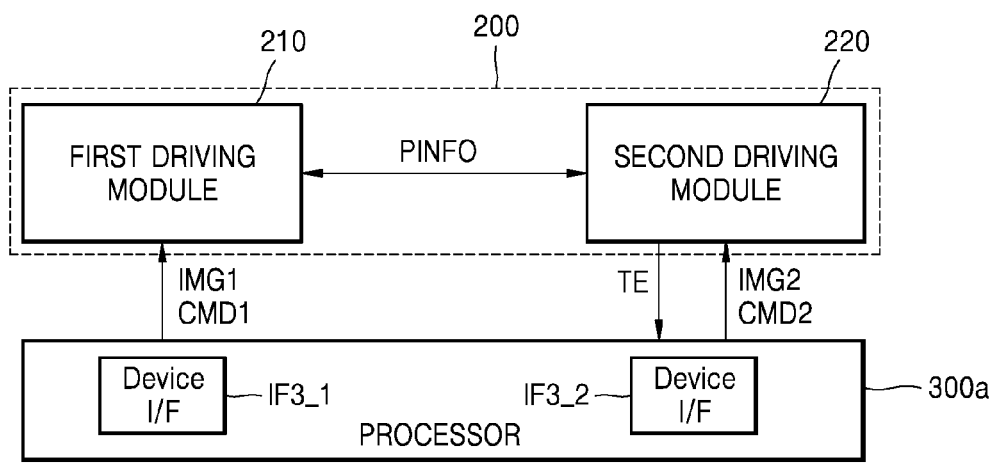
FIGS. 16A and 16B are block diagrams respectively illustrating processors according to various embodiments of the present disclosure.
Figure 16B:
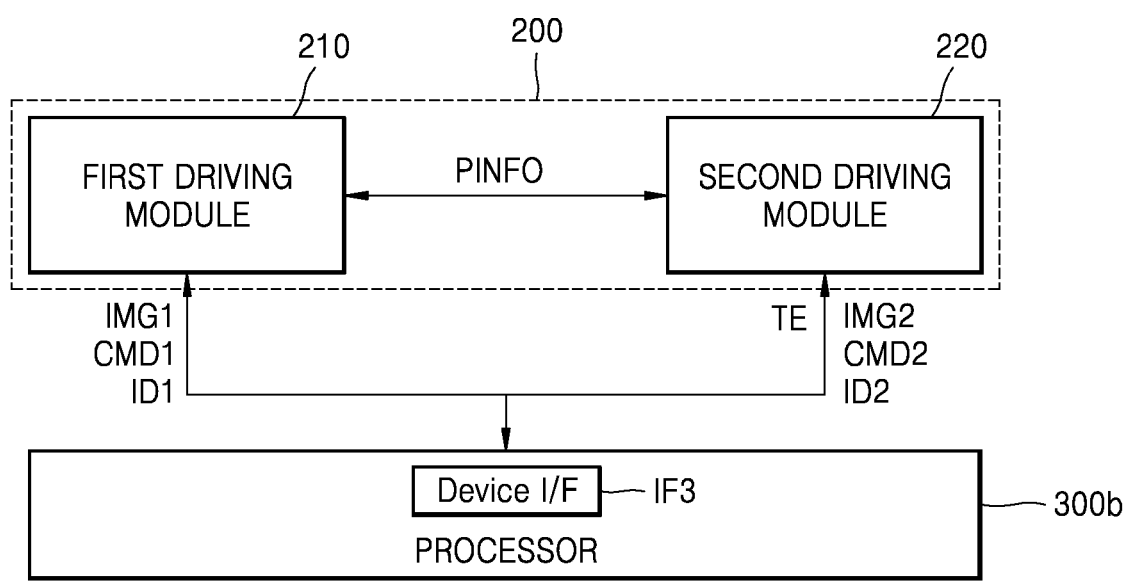

FIGS. 16A and 16B are block diagrams respectively illustrating processors according to various embodiments of the present disclosure. For convenience of a description, the display driver 200 is illustrated together.

Referring to FIG. 16A, a processor 300a (for example, the processor 300) may include a plurality of device interfaces IF3_1 and IF3_2. The device interface IF3_1 may transmit or receive a signal to or from a first driving module 210, and the device interface IF3_2 may transmit or receive a signal to or from a second driving module 220. For example, the first device interface IF3_1 may transmit a first image IMG1 and a first command IMD1 to the first driving module 210. The second device interface IF3_2 may transmit a second image IMG2 and a second command IMD2 to the second driving module 220 and receive a TE signal TE from the second driving module 220. Each of the device interfaces IF3_1 and IF3_2 may include, for example, one selected from an RGB interface, a CPU interface, a serial interface, an MDDI, an I2C interface, a SPI, a MCU interface, a MIPI, an eDP interface, or a HDMI.

Referring to FIG. 16B, a processor 300b (for example, the processor 300) may include one device interface IF3. According to an embodiment, the device interface IF3 may transmit first and second images IMG1 and IMG2 and signals such as first and second commands CMD1 and CMD2 to an arbitrary driving module along with first and second identifiers (IDs) ID1 and ID2 that indicate the transmission of the signals. The first and second identifiers ID1 and ID2 may be replaced with, for example, a chip selection signal or an address for a driving module.

A first driving module 210 or a second driving module 220 may check the first or second identifier ID1 or ID2 which is transmitted from the processor 300b through the device interface IF3. At least one of the first and second driving modules 210 and 220 corresponding to the checked identifier ID1 or ID2 may receive a signal (for example, a command, a clock, or the like) or the image IMG1 or IMG2 transmitted from the processor 300b.

According to an embodiment, the device interface IF3 may transmit the first image IMG1 and the first command CMD1 along with the first identifier ID1. In this case, the first driving module 210 may receive the first image IMG1 and the first command CMD1.

According to an embodiment, the device interface IF3 may transmit the second image IMG2 and the second command CMD2 along with the second identifier ID2. In this case, the second driving module 220 may receive the second image IMG2 and the second command CMD2.

According to an embodiment, the device interface IF3 may transmit a third image (for example, an image where the first image is the same as the second image), the first command CMD1, and the second command CMD2 along with the first identifier ID1 and the second identifier ID2. In this case, the first driving module 210 may receive the third image and the first command CMD1, and the second driving module 220 may receive the third image and the second command CMD2.

Figure 17:
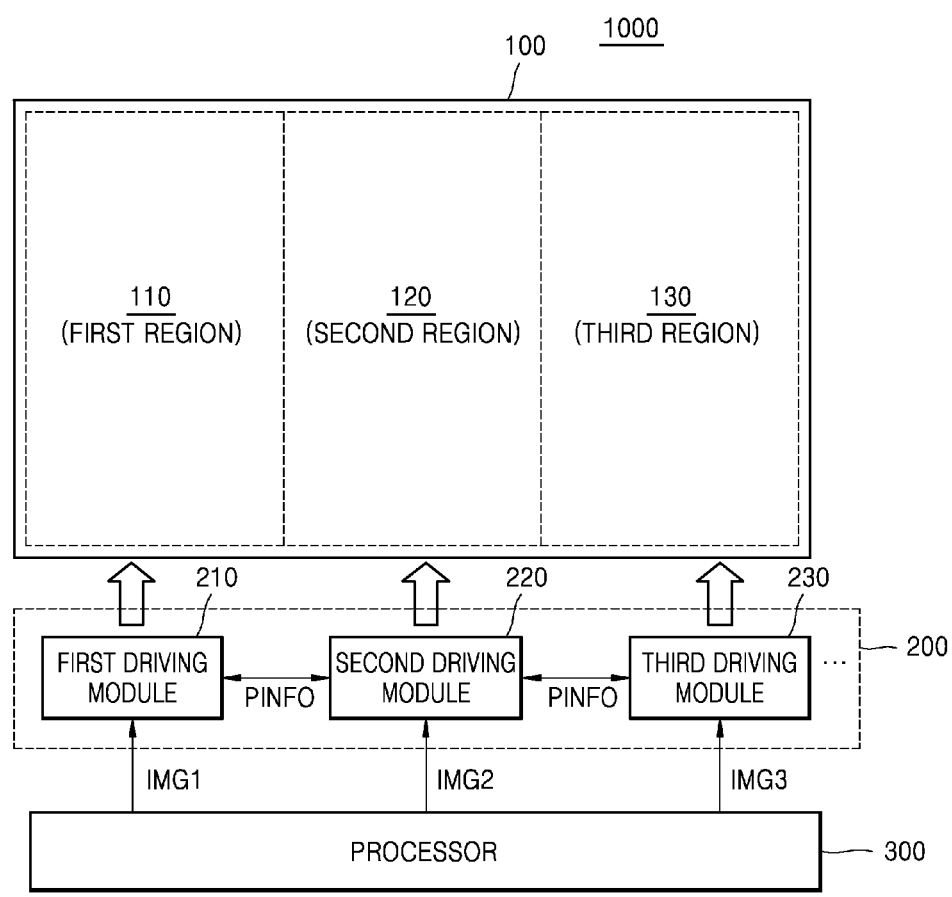
FIGS. 17, 18, and 19 are block diagrams illustrating an electronic device according to various embodiments of the present disclosure.

FIG. 17 is a block diagram illustrating an electronic device 1000 according to various embodiments of the present disclosure. Referring to FIG. 17, the electronic device 1000 may include a display 100, a display driver 200, and a processor 300.

According to an embodiment, the display 100 may include a plurality of regions 110, 120 and 130. In FIG. 17, the display 100 is illustrated as including three the regions 110, 120 and 130, but is not limited thereto. The display 100 may a more number of regions.

According to an embodiment, the display driver 200 may include a plurality of driving modules 210, 220 and 230 and drive the display 100 to display an image. In FIG. 17, the display driver 200 is illustrated as including three the driving modules 210, 220 and 230, but is not limited thereto. The display driver 200 may include a more number of driving modules, and the number of the driving modules may correspond to the number of the regions 110, 120 and 130 included in the display 100.

The first driving module 210 may receive a first image IMG1 and display the first image IMG1 on the first region 110. The second driving module 220 may receive a second image IMG2 and display the second image IMG2 on the second region 120. The third driving module 230 may receive a third image IMG3 and display the third image IMG3 on the third region 130. Each of the first driving module 210, the second driving module 220, and the third driving module 230 may be implemented with hardware, software, firmware, an IC, or the like. According to an embodiment, each of the first driving module 210, the second driving module 220, and the third driving module 230 may be provided as a separate semiconductor IC.

According to an embodiment, the plurality of driving modules 210, 220 and 230 may share processing information PINFO about the first image IMG1, the second image IMG2, or the third image IMG3 and compensate for at least one selected from the first image IMG1, the second image IMG2, and the third image IMG3, based on the processing information PINFO. According to an embodiment, one (for example, a master driving module (for example, the second driving module 220)) of the plurality of driving modules 210, 220 and 230 may control overall image processing. Furthermore, a slave driving module (for example, the first driving module 210 or the third driving module 230) may supply information about an image, to be displayed on a region (for example, the first region or the third region) corresponding to each driving module, to the master driving module (for example, the second driving module 220) as the processing information PINFO. A detailed image processing method and a detailed image compensation method are obvious to one of ordinary skill in the art as described above, and thus, repetitive descriptions are not repeated.

According to an embodiment, the processor 300 may transfer, to the display driver 200, an image to be displayed by the display 100 and control signals necessary for an operation of the display driver 200. The processor 300 may acquire a frame image and classify the frame image into the first image IMG1, the second image IMG2, and the third image IMG3. The processor 300 may supply the first image IMG1 to the first driving module 210, supply the second image IMG2 to the second driving module 220, and supply the third image IMG3 to the third driving module 230.

Figure 18:
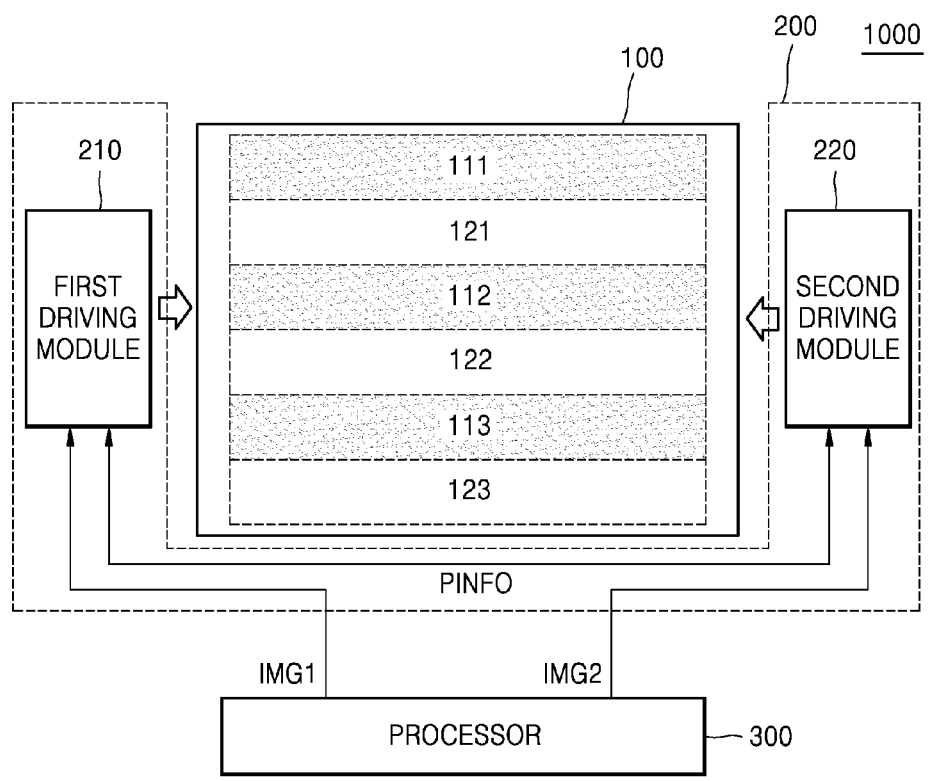

FIG. 18 is a block diagram illustrating an electronic device 1000 according to various embodiments of the present disclosure. Referring to FIG. 18, the electronic device 1000 may include a display apparatus including a display 100, a display driver 200, and a processor 300.

FIG. 18 illustrates a modified embodiment of the electronic device 1000 of FIG. 1. Referring to FIG. 18, the display 100 may include a plurality of first regions 111 to 113 and a plurality of second regions 121 to 123. Each of the regions 111 to 113 and 121 to 123 may include one or more lines. For example, the plurality of first regions 111 to 113 and the plurality of second regions 121 to 123 may be divided in units of m rows (where m is a natural number). In FIG. 18, it is illustrated that the plurality of first regions 111 to 113 include three regions and the plurality of second regions 121 to 123 include three regions. However, this is merely an example, and the present embodiment is not limited thereto. The number of regions included in the plurality of first regions 111 to 113 and the number of regions included in the plurality of second regions 121 to 123 may be variously changed, and for example, may be changed depending on the number of rows included in each of the regions 111 to 113 and 121 to 123 and a resolution of the display 100.

According to an embodiment, the display driver 200 may include a first driving module 210 and a second driving module 220 and display an image in the display 100. The first driving module 210 may receive a first image IMG1 and display the first image IMG1 in the plurality of first regions 111 to 113. The second driving module 220 may receive a second image IMG2 and display the second image IMG2 in the plurality of second regions 121 to 123. The first image IMG1 and the second image IMG2 may be displayed at the same time or at different times. For example, the first image IMG1 and the second image IMG2 may be displayed with a time difference that a user cannot recognize.

According to an embodiment, the first driving module 210 and the second processing module 220 may share processing information PINFO about the first image IMG1 or the second image IMG2 and compensate for the first image IMG1 or the second image IMG2, based on the processing information PINFO.

According to an embodiment, the processor 300 may transfer, to the display driver 200, an image to be displayed in the display 100 and control signals necessary for an operation of the display driver 200. The processor 300 may supply the first image IMG1 to the first driving module 210 and supply the second image IMG2 to the second driving module 220. According to an embodiment, the first image IMG1 and the second image IMG2 may be included in one frame image. The processor 300 may divide the frame image into the first image IMG1 to be displayed in the plurality of first regions 111 to 113 and the second image IMG2 to be displayed in the plurality of second regions 121 to 123, thereby generating the frame image. The processor 300 may supply the first image IMG1 or the second image IMG2 to the first driving module 210 or the second driving module 220.

Figure 19:
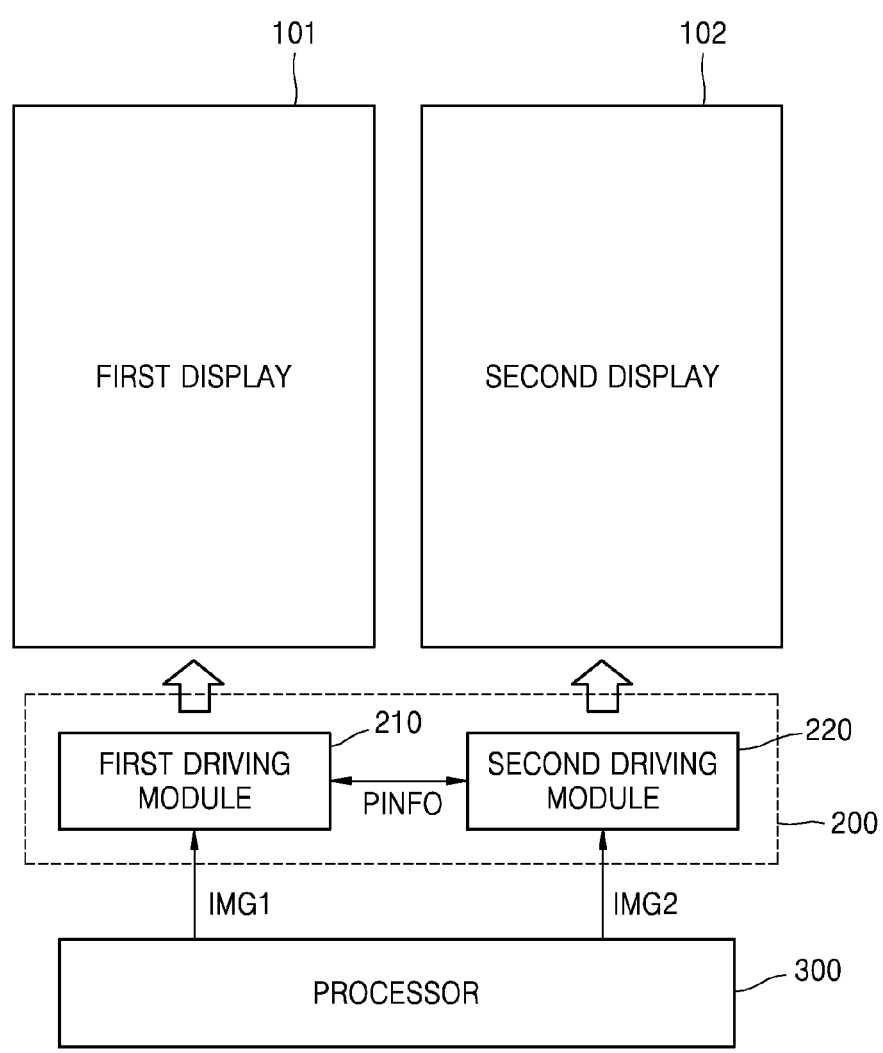

FIG. 19 is a block diagram illustrating an electronic device 1000*b* according to various embodiments of the present disclosure. The electronic device 1000*b* (for example, the electronic device 1000) according to the present embodiment may include a plurality of displays. Referring to FIG. 19, the electronic device 1000*b* may include a first display 101, a second display 102, a display driver 200, and a processor 300.

According to an embodiment, the first display 101 may display a first image IMG1, and the second display 121 may display a second image IMG2. The first image IMG1 and the second image IMG2 may be different images or the same images. The first image IMG1 and the second image IMG2 may be included in one frame. In FIG. 19, the first display 101 and the second display 102 are illustrated as having the same size, but are not limited thereto. The first display 101 and the second display 102 may have different sizes.

According to an embodiment, the display driver 200 may include a first driving module 210 and a second driving module 220, which may display respective images in the first display 101 and the second display 102. The first driving module 210 may receive the first image IMG1 and display the first image IMG1 in the first display 101. The second driving module 220 may receive the second image IMG2 and display the second image IMG2 in the second display 102.

According to an embodiment, the first driving module 210 and the second processing module 220 may share processing information PINFO about the first image IMG1 or the second image IMG2 and compensate for the first image IMG1 or the second image IMG2, based on the processing information PINFO.

According to an embodiment, the processor 300 may transfer, to the display driver 200, an image to be displayed in the first display 101 or the second display 102 and control signals necessary for an operation of the display driver 200. The processor 300 may supply the first image IMG1 to the first driving module 210 and supply the second image IMG2 to the second driving module 220.

Figure 20:
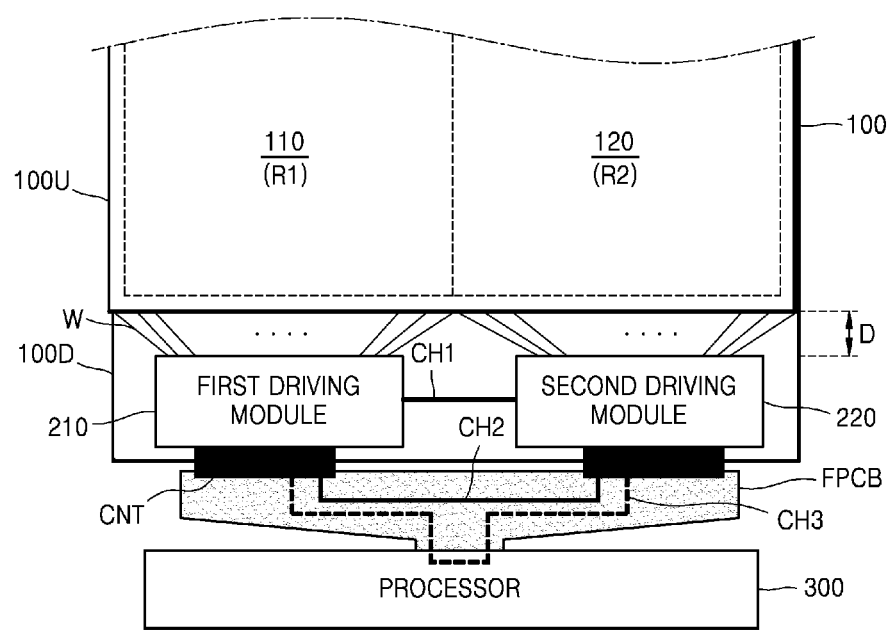
FIG. 20 is a diagram illustrating a structure of a display module according to various embodiments of the present disclosure.

FIG. 20 is a diagram illustrating a structure of a display module 1100 according to various embodiments of the present disclosure.

Referring to FIG. 20, the display module 1100 may include, for example, a display 100, a plurality of driving modules 210 and 220, a connector CNT, or a flexible printed circuit board (FPCB).

According to an embodiment, the display 100 is a display panel and may be manufactured by bonding an upper substrate 100U to a lower substrate 100D. The upper substrate 100U and the lower substrate 100D may be each formed of glass or tempered glass. Although not shown, a window glass and a touch screen panel may be disposed on or inside the display 100.

According to an embodiment, each of the plurality of driving modules 210 and 220 may be provided as a separate semiconductor IC. The plurality of driving modules 210 and 220 may be mounted on the lower substrate 100D of the display 100 in a chip-on glass (COG) type. In FIG. 20, the display module 1100 is illustrated as including two driving modules, for example, the first driving module 210 and the second driving module 220, but is not limited thereto. The number of the driving modules may be variously changed depending on a resolution of the display 100 and a size of each of the substrates 100U and 100D.

According to an embodiment, the first driving module 210 or the second driving module 220 may be electrically coupled to the display 100 through a plurality of wires W which are formed on the lower substrate D. The first driving module 210 may be coupled to a first region 110 of the display 100, and the second driving module 220 may be coupled to a second region 120 of the display 100. The plurality of wires W may be formed by patterning a conductive material (for example, metal or carbon) on the lower substrate 100D. In the display module 1100, the plurality of driving modules 210 and 220 may drive the display 100, and thus, the number of wires which are fanned out from a driving module is reduced compared to a case where one driving module drives the display 100. Therefore, a thickness D (for example, a separation distance between the display 100 and the driving module 210 or 220) of a layout where the plurality of wires W are formed is reduced.

According to an embodiment, the first driving module 210 and the second driving module 220 may be coupled to, for example, the FPCB through the connector CNT, a surface-mount device (SMD), or a hot bar and may be electrically coupled to the processor 300 through the FPCB. In FIG. 20, the FPCB is illustrated as being directly coupled to the processor 300. This is for convenience of a description, the FPCB may be coupled to a substrate where the processor 300 is disposed.

As described above, the first driving module 210 may transmit or receive signals (for example, the processing information PINFO, the compensation data CDATA, etc.) to or from the second driving module 220, for compensating for an image. According to an embodiment, a communication channel that enables the signals to be transmitted may be established between the first driving module 210 and the second driving module 220. For example, the communication channel may be formed on the substrate 100D of the display 100 like a channel 1 CH1. As another example, the communication channel may be formed on the FPCB like a channel 2 CH2 or may be independently formed through another FPCB (not shown).

As another example, the communication channel may be electrically coupled to, like a channel 3 CH3, the first driving module 210 and the second driving module 220 through the processor 300.

The first driving module 210 may directly communicate with the second driving module 220 through at least one of the communication channels CH1 to CH3.

An electronic device (for example, the electronic device 100) according to an embodiment may include a display (for example, the display 100) including a first region (for example, the first region 110) and a second region (for example, the second region 120), a first driving module (for example, the first driving module 210) configured to generate processing information (for example, the processing information PINFO or the first processing information PINFO1) corresponding to a first image (for example, the first image IMG1) to be displayed in the first region 110 of the display 100, and a second driving module (for example, the second driving module 220) configured to receive the processing information PINFO from the first driving module 210 and compensate for a second image (for example, the second image IMG2) to be displayed in the second region 120 of the display 100, based on the processing information PINFO.

According to an embodiment, the first driving module 210 may be configured to display the first image IMG1 on the first region 110, and the second driving module 220 may be configured to display the second image IMG2 on the second region 120.

According to an embodiment, the second driving module 220 may be configured to generate a luminance control signal for controlling light supplied to the display 100, based on the processing information PINFO about the first image IMG1.

According to an embodiment, the display module 1100 may further include a processor (for example, the processor 300) configured to acquire frame image information which is to be supplied to the display 100, classify the frame image information into the first image IMG1 to be displayed in the first region 110 and the second image IMG2 to be displayed in the second region 120, and respectively supply the first image IMG1 and the second image IMG2 to the first driving module 210 and the second driving module 220.

According to an embodiment, the second driving module 220 may be configured to transmit a TE signal for informing the processor 300 that the first and second driving modules 210 and 220 are in a state capable of receiving the first image IMG1 and the second image IMG2, based on states of the first and second driving modules 210 and 220.

According to an embodiment, the processor 300 may be configured to transmit, to the first driving module 210, a first command (for example, the first command CMD1) for setting a display condition (for example, gamma, luminance, brightness, chroma, contrast, sharpness, a color reproduction rate, a color, a display timing, and/or the like) of the first image IMG1 and transmit, to the second driving module 220, a second command (for example, the second command CMD2) for setting a display condition of the second image IMG2.

According to an embodiment, the second driving module 220 may be configured to generate a command execution signal (for example, the execution signal EXE) which determines application timings of the first command CMD1 and the second command CMD2, and the first driving module 210 and the second driving module 220 may be configured to apply the first command CMD1 and the second command CMD2 to respective registers included therein in response to the command execution signal EXE.

According to an embodiment, the first command CMD1 may be configured to set a display condition identically or similarly to a display condition corresponding to the second command CMD2.

According to an embodiment, each of the first and second driving modules 210 and 220 may include a timing controller (for example, the timing controller TCON1 or TCON2) configured to generate a timing control signal for controlling the first region 110 or the second region 120, based on image information corresponding to the first image IMG1 or the second image IMG2 and process the first image IMG1 or the second image IMG2, based on the timing control signal.

According to an embodiment, each of the first and second driving modules 210 and 220 may include an interface (for example, the internal interface IF2_1 or IF2_2) for transmitting or receiving a signal between first and second driving modules 210 and 220.

According to an embodiment, the interface may include a serial interface.

According to an embodiment, each of the first and second driving modules 210 and 220 may be provided as a separate semiconductor IC.

According to an embodiment, the processing information PINFO may include at least one of pieces of processing information based on image processing results that are obtained in units of a pixel, a line, or a frame of the first image IMG1.

According to an embodiment, the processing information PINFO may include at least one selected from pixel data of at least a portion of the first image IMG1, which is displayed on a portion adjacent to the second region 120, and histogram information associated with the first image IMG1.

According to an embodiment, other processing information (for example, the second processing information PINFO2) corresponding to the second image IMG2 may be generated.

According to an embodiment, the first driving module 210 may be configured to compensate for the first image IMG1, based on the other processing information PINFO2.

According to an embodiment, the other processing information PINFO2 may include pixel data of at least a portion of the second image IMG2 that is displayed on a portion adjacent to the first region 110.

According to an embodiment, the second driving module 220 may be configured to generate compensation data (for example, the compensation data CDATA) for compensating for the first image IMG1 and the second image IMG2, based on the processing information PINFO and the other processing information PINFO2.

According to an embodiment, the compensation data CDATA may include at least one selected from luminance compensation data, gamma compensation data, and a pixel data scale value of an image.

According to an embodiment, each of the first and second driving modules 210 and 220 may be provided on at least a portion of a substrate where the display 100 is formed, and a communication channel (for example, at least one selected from the channel 1 CH1, the channel 2 CH2, and the channel 3 CH3) between the first and second driving modules 210 and 220 may be formed on the substrate.

An electronic device (for example, the electronic device 1000) according to another embodiment may include: a first display (for example, the first display 101) that displays the first image IMG1; a second display (for example, the second display 102) that displays the second image IMG2; a first display driving module (for example, the first driving module 210) configured to control the first display 101 and generate first image information (for example, the first processing information PINFO1) corresponding to the first image IMG1; a second display driving module (for example, the second driving module 220) configured to control the second display 102, generate second image information (for example, the second processing information PINFO2) corresponding to the second image IMG2, and generate compensation data about at least one selected from the first image information PINFO1 and the second image information PINFO2, based on the first image information and the second image information; and a processor 300 configured to transmit the first image IMG1 to the first display driving module 210 and transmit the second image IMG2 to the second display driving module 220.

According to an embodiment, the second display driving module 220 may be configured to transmit the compensation data CDATA to the first driving module 210.

According to an embodiment, the second display driving module 220 may be configured to control light supplied to the first and second displays 101 and 102, based on the first image information PINFO1 and the second image information PINFO2.

According to an embodiment, the second display driving module 220 may be configured to control pixel data values or gamma curves of the first image IMG1 and the second image IMG2, based on a luminance of the light.

According to an embodiment, each of the first and second displays 101 and 102 may include a pentile type pixel structure.

According to an embodiment, the display module 1100 may further include a third display, which is configured to display a third image, and a third display driving module configured to generate third image information corresponding to the third image.

According to an embodiment, the first and second display driving modules 210 and 220 may be coupled to a PCB (for example, an FPCB) through a connector (for example, the connector CNT), and a communication channel (for example, at least one selected from the channel 1 CH1, the channel 2 CH2, and the channel 3 CH3) between the first and second display driving modules 210 and 220 may be formed on the FPCB.

According to an embodiment, the first display driving module 210 may communicate with the second display driving module 220 through the processor 300.

An electronic device (for example, the electronic device 1000) according to another embodiment may include: a display panel (for example, the display 100) including a first region (for example, the first region 110) and a second region (for example, the second region 120); a first driving module (for example, the first driving module 210) configured to receive a first image (for example, the first image IMG1), to be displayed in the first region 110, from a processor (for example, the processor 300) functionally coupled to the display panel 100 and generate first image information (for example, the first processing information PINFO1) corresponding to the first image IMG1; and a second driving module (for example, the second driving module 220) configured to receive a second image (for example, the second image IMG2), to be displayed in the second region 120, from the processor 300 and compensate for the second image IMG2, based on the first image information PINFO1.

According to an embodiment, each of the first and second driving modules 210 and 220 may include a source driver (for example, the source driver SDRV_1 or SDRV_2) that applies a grayscale voltage to the display panel 100, a timing controller (for example, the timing controller TCON1 or TCON2) that performs image processing on a received image, a first interface (for example, the host interface IF1_1 or IF1_2) that transmits or receives a signal to or from an external processor 300, and a second interface (for example, the internal interface IF2_1 or IF2_2) that transmits or receives a signal between the first driving module 210 and the second driving module 220.

An electronic device (for example, the electronic device 1000) according to another embodiment may include a first driving module (for example, the first driving module 210) and a second driving module (for example, the second driving module 220). The first driving module 210 and the second driving module 220 may respectively receive a first image (for example, the first image IMG1) and a second image (for example, the second image IMG2). The first driving module 210 may generate processing information (for example, the processing information PINFO), based on the first image IMG1. The first driving module 210 may transmit the processing information PINFO to the second driving module 220. The second driving module 220 may compensate for the second image IMG2, based on the transmitted processing information PINFO.

According to an embodiment, the second driving module 220 may generate other processing information (for example, the second processing information PINFO2), based on the second image IMG2 and transmit the other processing information PINFO2 to the first driving module 210. The first driving module 210 may compensate for the first image IMG1, based on the transmitted other processing information PINFO2. The first driving module 210 may display the compensated first image IMG1 on a first region 110 of a display (for example, the display 100), and the second driving module 220 may display the compensated second image IMG2 on a second region 120 of the display 100.

According to an embodiment, the electronic device 1000 may further include a processor 300. The processor 300 may acquire a frame image and classify the frame image into the first image IMG1 and the second image IMG2.

According to an embodiment, the processing information PINFO1 may include at least one selected from pixel data of at least a portion of the first image IMG1 and histogram information associated with the first image IMG1.

According to an embodiment, the first driving module 210 may receive the first image IMG1 along with a first command (for example, the first command CMD1) for setting a display condition (for example, gamma, luminance, brightness, chroma, contrast, sharpness, a color reproduction rate, a color, a display timing, and/or the like) of the first image IMG1

According to an embodiment, the second driving module 220 may receive the second image IMG2 along with a second command (for example, the second command CMD2) for setting a display condition of the second image IMG2.

According to an embodiment, the second driving module 220 may generate a command execution signal (for example, the execution signal EXE) which determines application timings of the first command CMD1 and the second command CMD2, and the first driving module 210 and the second driving module 220 may apply the first command CMD1 and the second command CMD2 to respective registers included therein in response to the command execution signal EXE.

According to an embodiment, the first and second driving modules 210 and 220 may transmit the processing information PINFO through a communication channel (for example, at least one selected from the channel 1 CH1, the channel 2 CH2, and the channel 3 CH3) between the first and second driving modules 210 and 220.

An electronic device (for example, the electronic device 1000) according to another embodiment may include a first driving module (for example, the first driving module 210) and a second driving module (for example, the second driving module 220). The first driving module 210 and the second driving module 220 may respectively receive a first image (for example, the first image IMG1) and a second image (for example, the second image IMG2). The first driving module 210 may generate first processing information (for example, the first processing information PINFO1), based on the first image IMG1, and the second driving module 220 may generate second processing information (for example, the second processing information PINFO2), based on the second image IMG2. The first driving module 210 may transmit the first processing information PINFO1 to the second driving module 220. The second driving module 220 may generate compensation data (for example, the compensation data CDATA), based on the first processing information PINFO1 and the second processing information PINFO2.

According to an embodiment, the second driving module 220 may transmit the compensation data CDATA to the first driving module 210. The first driving module 210 may compensate for the first image IMG1, based on the compensation data CDATA, and the second driving module 220 may compensate for the second image IMG2, based on the compensation data CDATA. The first driving module 210 and the second driving module 220 may display the compensated first image IMG1 and the compensated second image IMG2 on a corresponding region (for example, the first region 110 or the second region 120) of the display 100.

According to an embodiment, the compensation data CDATA may include at least one selected from luminance compensation data of light, gamma compensation data, and an image scale value.

According to an embodiment, the first driving module 210 or the second driving module 220 may a level of a pixel data value or a gamma curve of at least one selected from the first image IMG1 and the second image IMG2.

According to an embodiment, each of the first image IMG1 and the second image IMG2 may be at least a portion of a frame image that is displayed by the display 100.

Figure 21:
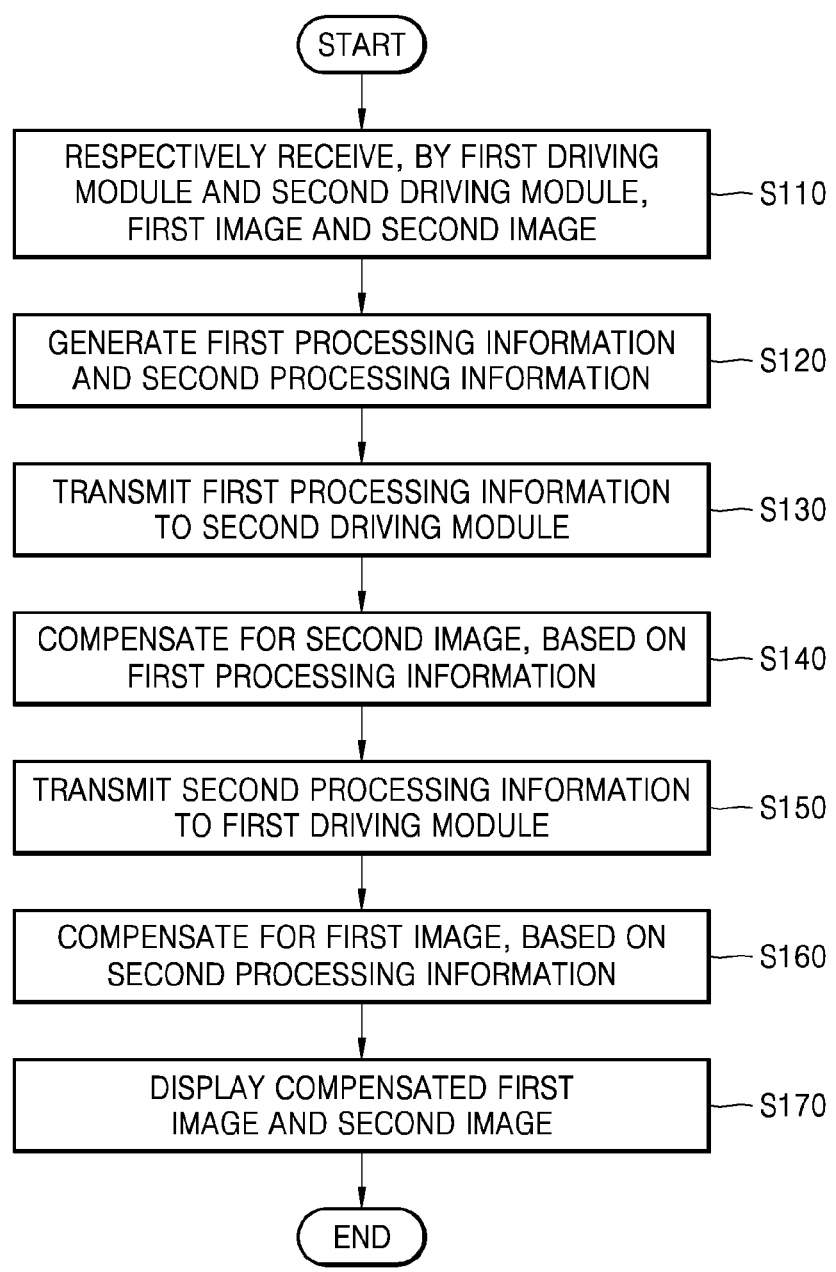
FIG. 21 is a flowchart illustrating a method of operating an electronic device according to various embodiments of the present disclosure.

FIG. 21 is a flowchart illustrating a method of operating an electronic device, according to various embodiments of the present disclosure. An electronic device (for example, the electronic device 1000) according to an embodiment may include a display (for example, the display 100), a plurality of driving modules (for example, the first driving module 210 and the second driving module 220) that drive the display 100, and a processor 300 that transmits an image to the first driving module 210 and the second driving module 220.

Referring to FIG. 21 and according to an embodiment, in operation S110, the first driving module 210 and the second driving module 220 may respectively receive a first image IMG1 and a second image IMG2. The first image IMG1 and the second image IMG2 may be received from the processor 300. The first image IMG1 and the second image IMG2 may be different images or the same images. Alternatively, each of the first image IMG1 and the second image IMG2 may be at least a portion of a frame image that is displayed by the display. The processor 300 may acquire the frame image, classify the frame image into the first image IMG1 and the second image IMG2, and transmit the first image IMG1 and the second image IMG2 to the first driving module 210 and the second driving module 220.

According to an embodiment, in operation S110 of receiving the first image IMG1 and the second image IMG2, the first driving module 210 may receive the first image IMG1 along with a first command (for example, the first command CMD1) for setting a display condition (for example, gamma, luminance, brightness, chroma, contrast, sharpness, a color reproduction rate, a color, a display timing, and/or the like) of the first image IMG1, and the second driving module 220 may receive the second image IMG2 along with a second command (for example, the second command CMD2) for setting a display condition of the second image IMG2. When the first command CMD1 and the second command CMD2 are received, the second driving module 220 may generate a command execution signal that determines a command application timing. The first driving module 210 and the second driving module 220 may apply the first command CMD1 and the second command CMD2 to respective registers included therein in response to the command execution signal.

According to an embodiment, in operation S120, the first driving module 210 may generate first processing information (for example, the first processing information PINFO1), based on the received first image IMG1, and the second driving module 220 may generate second processing information (for example, the second processing information PINFO2), based on the received second image IMG2. The processing information (for example, the first processing information PINFO1 or the second processing information PINFO2) may include various kinds of information or data that are generated based on corresponding images (for example, the first image IMG1 or the second image IMG2). According to an embodiment, the processing information (for example, the first processing information PINFO1 or the second processing information PINFO2) may include an image processing result or an image analysis result of each of the corresponding images (for example, the first image IMG1 or the second image IMG2) or pixel data of some of the corresponding images. According to another embodiment, the processing information (for example, the first processing information PINFO1 or the second processing information PINFO2) may include a histogram of an image.

According to an embodiment, in operation S130, the first driving module 210 may transmit the first processing information PINFO1 to the second driving module 220. For example, the first driving module 210 may directly transmit or receive a signal to or from the second driving module 220 in a serial interface scheme. To this end, a communication channel (for example, at least one of first to third channels CH1 to CH3) may be established between the first driving module 210 and the second driving module 220. As another example, the first driving module 210 may transmit or receive a signal to or from the second driving module 220 through the processor 300. The first driving module 210 may transmit the first processing information PINFO1 to the processor 300 by communicating with the processor 300, and the processor 300 may supply the received first processing information PINFO1 to the second driving module 220.

According to an embodiment, in operation S140, the second driving module 220 may compensate for the second image IMG2, based on the received first processing information PINFO1. For example, the second driving module 220 may compensate for a quality of the second image IMG2. The second driving module 220 may compensate for the second image IMG2 through various image processing methods.

According to an embodiment, in operation S150, the second driving module 220 may transmit the second processing information PINFO2 to the first driving module 210. As described above, the second driving module 220 may transmit the second processing information PINFO2 to the first driving module 210 through a communication channel, which is directly connected to the first driving module 210, or through the processor 300.

According to an embodiment, in operation S160, the first driving module 210 may compensate for the first image IMG1, based on the second processing information PINFO2. The first driving module 210 may compensate for the first image IMG1 through the same image processing method as that of the second driving module 220. Operation S140 of compensating for the second image IMG2 based on the first processing information PINFO1 and operation S160 of compensating for the first image IMG1 based on the second processing information PINFO2 may be simultaneously performed.

When the first image IMG1 and the second image IMG2 have been compensated for through the above-described operations, the compensated first image IMG1 and second image IMG2 may be displayed by a display (for example, the display 100) in operation S170. For example, the display 100 may include a plurality of regions (for example, the first region 110 and the second region 120), the first driving module 210 may display the compensated first image IMG1 on the first region 110 of the display, and the second driving module 220 may display the compensated second image IMG2 on the second region 120 of the display. As another example, the electronic device 1000 may include a plurality of displays (for example, the first display 101 and the second display 102), the first driving module 210 may display the first image IMG1 in the first display 101, and the second driving module 220 may display the second image IMG2 on the second display 102.

In the present embodiment, a case where the electronic device 1000 includes two driving modules 210 and 220 has been described above as an example, but the technical spirit of the present disclosure is not limited thereto. It is obvious to one of ordinary skill in the art that the electronic device 1000 may include a more number of driving modules, and the above-described method of operating the electronic device 1000 may be modified and applied.

Figure 22:
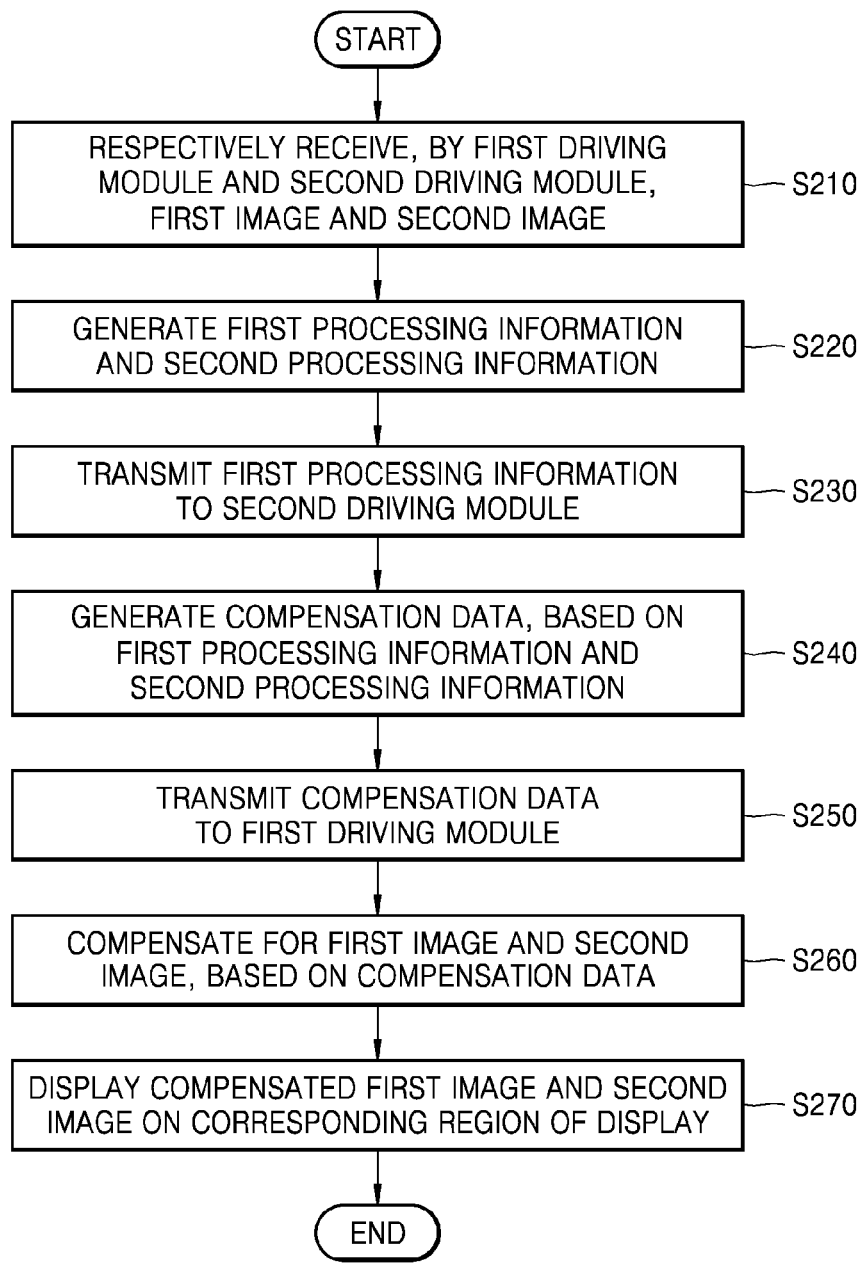
FIG. 22 is a flowchart illustrating a method of operating an electronic device according to various embodiments of the present disclosure.

FIG. 22 is a flowchart illustrating a method of operating an electronic device, according to various embodiments of the present disclosure.

Referring to FIG. 22 and according to an embodiment, in operation S210, a first driving module (for example, the first driving module 210) and a second driving module (for example, the second driving module 220) may respectively receive a first image IMG1 and a second image IMG2. The first driving module 210 may receive the first image IMG1, and the second driving module 220 may receive the second image IMG2. Each of the first image IMG1 and the second image IMG2 may be at least a portion of a frame image displayed by a display (for example, the display 100). For example, the first image IMG1 may be a half frame image of the frame image, and the second image IMG2 may be the other half frame image of the frame image.

According to an embodiment, in operation S220, the first driving module 210 may generate first processing information PINFO1, based on the received first image IMG1, and the second driving module 220 may generate second processing information PINFO2, based on the received second image IMG2.

According to an embodiment, the first driving module 210 may transmit the first processing information PINFO1 to the second driving module 220 in operation S230, and the second driving module 220 may generate compensation data CDATA, based on the received first processing information PINFO1 or second processing information PINFO2 in operation S240. For example, the compensation data CDATA may include gamma compensation data for controlling a gamma curve of a frame image that includes the first image IMG1 and the second image IMG2, luminance compensation data for controlling a luminance of the frame image, or an image scale value for scaling a pixel data value of the frame image.

According to an embodiment, the second driving module 220 may transmit the compensation data CDATA to the first driving module 210 in operation S250, and the first driving module 210 or the second driving module 220 may respectively compensate for the first image IMG1 or the second image IMG2, based on the compensation data CDATA in operation S260. For example, the first driving module 210 or the second driving module 220 may control a gamma curve of the first image IMG1 or the second image IMG2, based on the compensation data CDATA. As another example, the first driving module 210 or the second driving module 220 may scale pixel data of the first image IMG1 or the second image IMG2, based on the compensation data CDATA. As another example, when an electronic device (for example, the electronic device 1000) further includes a light source (for example, the backlight 400) that irradiates light onto a display (for example, the display 100), the second driving module 220 may control a luminance of the light source, based on the compensation data CDATA.

According to an embodiment, in operation S270, the compensated first image IMG1 or second image IMG2 may be displayed on a corresponding region (for example, the first region 110 or the second region 120) of the display 100. The first driving module 210 may display the compensated first image IMG1 on the first region 110 of the display 100, and the second driving module 220 may display the compensated second image IMG2 on the second region 120 of the display 100.

Figure 23:
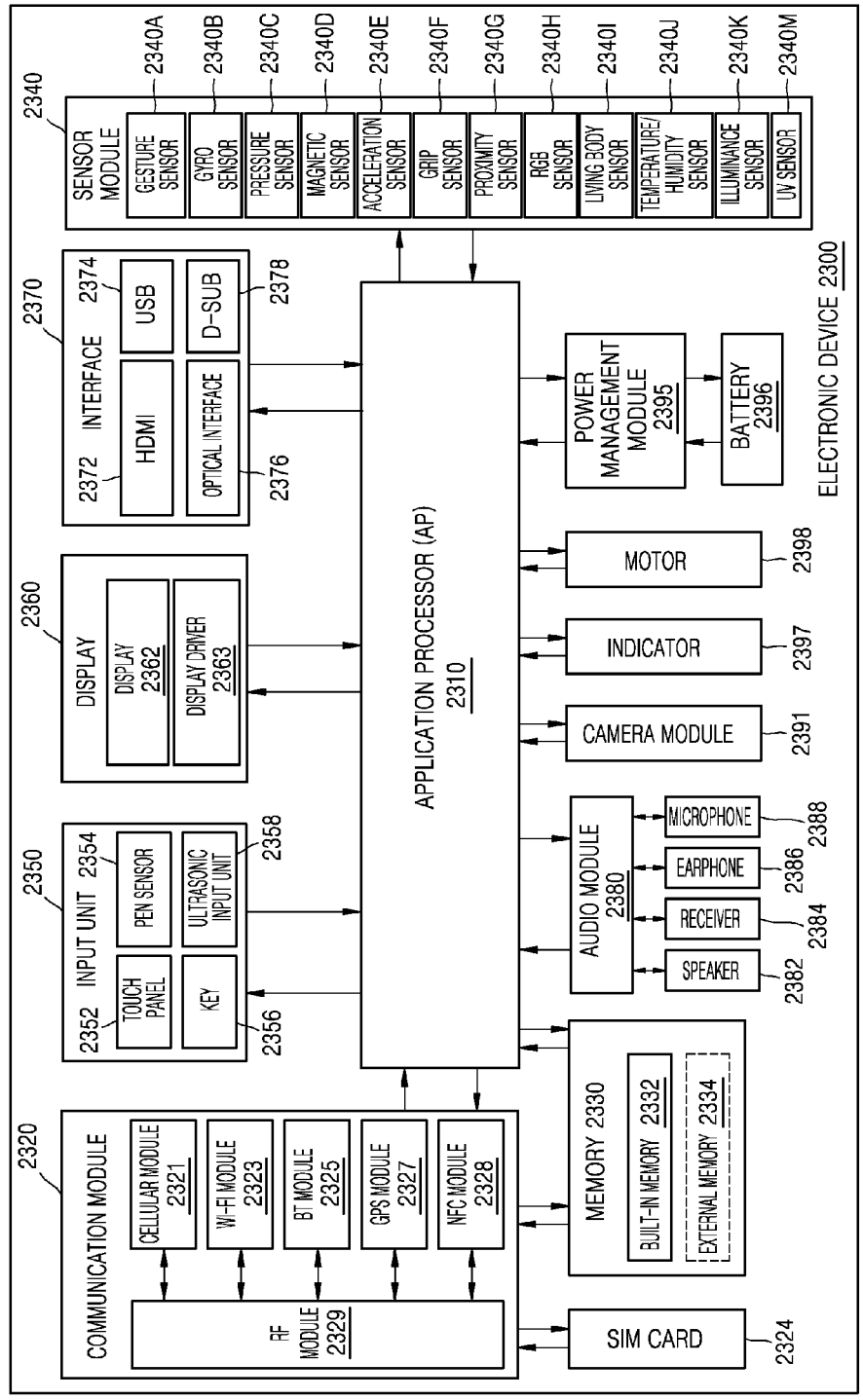
FIG. 23 is a block diagram illustrating an electronic device according to various embodiments of the present disclosure.

FIG. 23 is a block diagram illustrating an electronic device 2300 according to various embodiments of the present disclosure. The electronic device 2300, for example, may form all or a portion of the electronic device 1000 illustrated in FIG. 1. Referring to FIG. 23, the electronic device 2300 may include one or more application processors (AP) 2310, a communication module 2320, a subscriber identification module (SIM) card 2324, a memory 2330, a sensor module 2340, an input unit 2350, a display 2360, an interface 2370, an audio module 2380, a camera module 2391, a power management module 2395, a battery 2396, an indicator 2397, and a motor 2398.

The AP 2310 may drive an operating system (OS) or an application to control a plurality of hardware or software elements connected to the AP 2310, and may perform various processes of data including multimedia data and operations. The AP 2310, for example, may be implemented as a system on chip (SoC). According to an embodiment, the AP 2310 may further include a graphic processing unit (not shown).

The communication module 2320 may perform data transmission/reception in communication between other electronic devices connected with the electronic device 2300 via a network. According to an embodiment, the communication module 2320 may include a cellular module 2321, a Wi-Fi module 2323, a Bluetooth (BT) module 2325, a GPS module 2327, a near field communication (NFC) module 2328, and a radio frequency (RF) module 2329.

The cellular module 2321 may provide voice communication, video communication, a character service, or an Internet service, etc. via a communication network (e.g., an LTE, an LTE-A, a CDMA, a WCDMA, a UMTS, a WiBro, or a GSM, etc.). Also, the cellular module 2321, for example, may perform discrimination and authentication of an electronic device within a communication network using a subscriber identification module (e.g., the SIM card 2324). According to an embodiment, the cellular module 2321 may perform at least a portion of functions that may be provided by the AP 2310. For example, the cellular module 2321 may perform at least a portion of a multimedia control function.

According to an embodiment, the cellular module 2321 may include a communication processor (CP). Also, the cellular module 2321, for example, may be implemented as an SoC. Though elements such as the cellular module 2321 (e.g., the CP), the memory 2330, or the power management module 2395, etc. have been illustrated as elements separately from the AP 2310 in FIG. 23, but according to an embodiment, the AP 2310 may be implemented to include at least a portion (e.g., the cellular module 2321) of the above elements.

According to an embodiment, the AP 2310 or the cellular module 2321 (e.g., the CP) may load an instruction or data received from at least one of a non-volatile memory or other elements connected to the AP and the cellular module, to the non-volatile memory to process the same. Also, the AP 2310 or the cellular module 2321 may store data received from at least one of other elements or generated by at least one of other elements in a non-volatile memory.

Each of the Wi-Fi module 2323, the BT module 2325, the GPS module 2327, and the NFC module 2328, for example, may include a processor for processing data transmitted/received via the relevant module. Though the cellular module 2321, the Wi-Fi module 2323, the BT module 2325, the GPS module 2327, and the NFC module 2328 have been illustrated as separate blocks, respectively, in FIG. 23, but according to an embodiment, at least a portion (e.g., two or more elements) of the cellular module 2321, the Wi-Fi module 2323, the BT module 2325, the GPS module 2327, and the NFC module 2328 may be included in one IC or an IC package. For example, at least a portion (e.g., a communication processor corresponding to the cellular module 2321 and a Wi-Fi processor corresponding to the Wi-Fi module 2323) of communication processors corresponding to the cellular module 2321, the Wi-Fi module 2323, the BT module 2325, the GPS module 2327, and the NFC module 2328, respectively, may be implemented as one SoC.

The RF module 2329 may perform data transmission/reception, for example, transmission/reception of an RF signal. Though not shown, the RF module 2329, for example, may include a transceiver, a power amplifier module (PAM), a frequency filter, or low noise amplifier (LNA), etc. Also, the RF module 2329 may further include a part for transmitting a radio wave on a free space in wireless communication, for example, a conductor or a conducting wire, etc. Though the cellular module 2321, the Wi-Fi module 2323, the BT module 2325, the GPS module 2327, and the NFC module 2328 have been illustrated to share one RF module 2329 in FIG. 23, at least one of the cellular module 2321, the Wi-Fi module 2323, the BT module 2325, the GPS module 2327, and the NFC module 2328 may perform transmission/reception of an RF signal via a separate RF module according to an embodiment.

The SIM card 2324 may be a card including a subscriber identification module, and may be inserted to a slot formed in a specific position of the electronic device. The SIM card 2324 may include unique identify information (e.g., integrated circuit card identifier (ICCID) or subscriber information (e.g., integrated mobile subscriber identify (IMSI)).

The memory 2330 may include a built-in memory 2332 or an external memory 2334. The built-in memory 2332, for example, may include at least one of a volatile memory (for example, dynamic random access memory (DRAM), static random access memory (SRAM), synchronous dynamic random access memory (SDRAM), etc.), and a non-volatile memory (for example, one time programmable read-only memory (OTPROM), programmable read-only memory (PROM), erasable and programmable read-only memory (EPROM), electrically erasable and programmable read-only memory (EEPROM), mask ROM, flash ROM, NAND flash memory, NOR flash memory, etc.).

According to an embodiment, the built-in memory 2332 may be a solid state drive (SSD). The external memory 2334 may further include a flash drive, for example, a compact flash (CF), a secure digital (SD), a micro-secure digital (SD), a mini-SD, an extreme digital (xD), or a memory stick, etc. The external memory 2334 may be functionally connected with the electronic device 2300 via various interfaces. According to an embodiment, the electronic device 2300 may further include a storage (or a storage medium) such as a hard drive.

The sensor module 2340 may measure a physical quantity or detect an operation state of the electronic device 2300 to convert the measured or detected information to an electric signal. The sensor module 2340, for example, may include at least one selected from a gesture sensor 2340A, a gyro sensor 2340B, a pressure sensor 2340C, a magnetic sensor 2340D, an acceleration sensor 2340E, a grip sensor 2340F, a proximity sensor 2340G, a color sensor 2340H (e.g., an RGB sensor), a living body sensor 2340I, a temperature/humidity sensor 2340J, an illuminance sensor 2340K, and an UV sensor 2340M. Additionally or generally, the sensor module 2340, for example, may include an e-nose sensor (not shown), an electromyography sensor (EMG) sensor (not shown), an electroencephalogram (EEG) sensor (not shown), an electrocardiogram (ECG) sensor (not shown), an infrared (IR) sensor, an iris sensor (not shown), and a fingerprint sensor (not shown), etc. The sensor module 2340 may further include a control circuit for controlling at least one sensor belonging thereto.

The input unit 2350 may include a touch panel 2352, a (digital) pen sensor 2354, a key 2356, and an ultrasonic input unit 2358. The touch panel 2352, for example, may recognize a touch input using at least one of a capacitive overlay, a resistance overlay, an infrared beam, and an ultrasonic wave. Also, the touch panel 2352 may further include a control circuit. In case of a capacitive overlay, a physical contact or proximity recognition is possible. The touch panel 2352 may further include a tactile layer. In this case, the touch panel 2352 may provide a tactile reaction to a user.

The (digital) pen sensor 2354, for example, may be implemented using a method which is the same as or similar to receiving a user touch input, or a separate sheet for recognition. The key 2356, for example, may include a physical button, an optical key, or a keypad. The ultrasonic input unit 2358 is a device allowing the electronic device 2300 to detect a sound wave using a microphone 2388 to determine data via an input tool generating an ultrasonic signal, and enables wireless recognition. According to an embodiment, the electronic device 2300 may receive a user input from an external unit (e.g., a computer or a server) connected thereto using the communication module 2320.

The display 2360 may include a display panel 2362 and a display driver 2363. The display panel 2362, for example, may be an LCD or an AMOLED, etc. The display panel 2362, for example, may be implemented such that it is flexible, transparent, or wearable. The display panel 2362 may be implemented as one module with the touch panel 2352. The display panel 2362 may include a plurality of regions. Alternatively, the display panel 2362 may be provided in plurality.

The display panel 2362 may be replaced with a hologram device or a projector. The hologram device may show a stereoscopic image in a vacant space using interference of light. The projector may project light onto a screen to display an image. The screen, for example, may be positioned in the inside or outside of the electronic device 2300.

The display driver 2363 may include a plurality of driving modules and drive the display panel 2362. Each of the plurality of driving modules may receive a corresponding image from the AP 2310 and display the received image in a corresponding region of the display panel 2362 or in a corresponding display panel 2362 among a plurality of display panels 2362. In this case, the plurality of driving modules may share processing information about the received image and compensate for the image, based on the processing information.

The interface 2370, for example, may include a high-definition multimedia interface (HDMI) 2372, a universal serial bus (USB) 2374, an optical Interface 2376, or a D-subminiature (D-sub) 2378. Additionally or generally, the interface 2370, for example, may include a mobile high definition link (MHL) interface, a secure digital (SD) card/multi-media cared (MMC) interface, or an infrared data association (IrDA) standard interface.

The audio module 2380 may convert a sound and an electric signal in dual directions. The audio module 2380, for example, may process sound information input or output via a speaker 2382, a receiver 2384, an earphone 2386, or a microphone 2388.

The camera module 2391 is a unit that may shoot a still picture and a moving picture. According to an embodiment, the camera module 2391 may include one or more image sensors (e.g., a front sensor or a rear sensor), a lens (not shown), an image signal processor (ISP, not shown), or a flash (not shown) (e.g., an LED or an xenon lamp).

The power management module 2395 may manage power of the electronic device 2300. Although not shown, the power management module 2395, for example, may include a power management integrated circuit (PMIC) a charger IC, or a battery or fuel gauge.

The PMIC, for example, may be mounted inside an IC or an SoC semiconductor. A charging method may be divided into a wired method and a wireless method. The charger IC may charge a battery, and prevent an overvoltage or an overcurrent from a charger. According to an embodiment, the charger IC may include a charger IC for at least one of a wired charging method and a wireless charging method. For the wireless charging method, for example, there are a magnetic resonance method, a magnetic induction method, or an electromagnetic method, etc. An additional circuit for wireless charging, for example, circuits such as a coil loop, a resonance circuit, or a rectifier, etc. may be added.

A battery gauge, for example, may measure a remnant of the battery 2396, a voltage, a current, or a temperature during charging. The battery 2396 may store or generate electricity, and supply power to the electronic device 2300 using the stored or generated electricity. The battery 2396, for example, may include a rechargeable battery or a solar battery.

The indicator 2397 may display a specific state, for example, a booting state, a message state, or a charging state, etc. of the electronic device 2300 or a portion (e.g., the AP 2310) thereof. The motor 2398 may convert an electric signal to mechanical vibration. Although not shown, the electronic device 2300 may include a processing unit (e.g., a GPU) for supporting a mobile TV. The processing unit for supporting the mobile TV, for example, may process media data according to standards of DMB, digital video broadcasting (DVB), or media flow, etc.

Each of the above elements of the electronic device according to an embodiment of the present disclosure may be configured using one or more components, and a name of a relevant element may change depending on the kind of the electronic device. The electronic device according to an embodiment of the present disclosure may include at least one of the above elements, and a portion of the elements may be omitted or additional other elements may be further included. Also, some of the elements of the electronic device according to the present disclosure may combine to form one entity, thereby equally performing the functions of the relevant elements before the combination.

A method of operating an electronic device (for example, the electronic device 1000) according to an embodiment may include: respectively receiving, by a first driving module (for example, the first driving module 210) and a second driving module (for example, the second driving module 220), a first image (for example, the first image IMG1) and a second image (for example, the first image IMG2); generating, by the first driving module 210, processing information (for example, the processing information PINFO) based on the first image; transmitting, by the first driving module 210, the processing information PINFO to the second driving module; and compensating for, by the second driving module 220, the second image IMG2 based on the transmitted processing information PINFO.

According to an embodiment, the method may further include: generating, by the second driving module 220, other processing information (for example, the second processing information PINFO2), based on the second image IMG2; transmitting the other processing information PINFO2 to the first driving module 210; compensating for, by the first driving module 210, the first image IMG1 based on the transmitted other processing information PINFO2; and respectively displaying the compensated first image IMG1 and second image IMG2 in a first region 110 and a second region 120 of a display (for example, the display 100).

According to an embodiment, the electronic device 1000 may further include the processor 300. The method may further include acquiring, by the processor 300, a frame image to classify the frame image into the first image IMG1 and the second image IMG2.

According to an embodiment, the processing information PINFO may include at least one selected from pixel data of at least a portion of the first image IMG1 and histogram information associated with the first image IMG1.

According to an embodiment, the first driving module 210 may receive the first image IMG1 along with a first command (for example, the first command CMD1) for setting a display condition (for example, gamma, luminance, brightness, chroma, contrast, sharpness, a color reproduction rate, a color, a display timing, and/or the like) of the first image IMG1.

According to an embodiment, the second driving module 220 may receive the second image IMG2 along with a second command (for example, the second command CMD2) for setting a display condition of the second image IMG2.

According to an embodiment, the method may further include: generating a command execution signal (for example, the execution signal EXE) which determines a command application timing in the second driving module 220; and respectively applying, by the first driving module 210 and the second driving module 220, the first command CMD1 and the second command CMD2 to an internal register of the first driving module 210 and an internal register of the second driving module 220 in response to the command execution signal EXE.

According to an embodiment, the first and second driving modules 210 and 220 may transmit the processing information PINFO through a communication channel (for example, at least one selected from the channel 1 CH1, the channel 2 CH2, and the channel 3 CH3) between the first and second driving modules 210 and 220.

A method of operating an electronic device (for example, the electronic device 1000) according to an embodiment may include: respectively receiving, by a first driving module (for example, the first driving module 210) and a second driving module (for example, the second driving module 220), a first image (for example, the first image IMG1) and a second image (for example, the first image IMG2); generating, by the first driving module 210, first processing information (for example, the first processing information PINFO1) based on the first image IMG1; generating, by the second driving module 220, second processing information (for example, the second processing information PINFO2) based on the second image IMG2; transmitting the first processing information PINFO1 to the second driving module 220; and generating, by the second driving module 220, compensation data (for example, the compensation data CDATA) based on the first processing information PINFO1 and the second processing information PINFO2.

According to an embodiment, the method may further include: transmitting the compensation data CDATA to the first driving module 210; compensating for, by the first driving module 210, the first image IMG1 and compensating for, by the second driving module 220, the second image IMG2, based on the compensation data CDATA; and displaying, by the first driving module 210 and the second driving module 220, the compensated first image IMG1 and second image IMG2 in a corresponding region (for example, the first region 110 or the second region 120) of the display 100.

According to an embodiment, the compensation data CDATA may include at least one selected from luminance compensation data, gamma compensation data, and a pixel data scale value of an image.

According to an embodiment, the compensating of the first image IMG1 and the second image IMG2 may include controlling a level of a pixel data value or a gamma curve of at least one selected from the first image IMG1 and the second image IMG2.

According to an embodiment, each of the first image IMG1 and the second image IMG2 may be at least a portion of a frame image displayed by the display 100.

A method of operating an electronic device (for example, the electronic device 1000) according to an embodiment may include: generating, by a first driving module (for example, the first driving module 210), processing information (for example, the processing information PINFO or the first processing information PINFO1) corresponding to a first image (for example, the first image IMG1) to be displayed in the first region 110 of a display (for example, the display 100) which includes a first region (for example, the first region 110) and a second region (for example, the second region 120); receiving, by a second driving module (for example, the second driving module 220), the processing information PINFO from the first driving module 210; and compensating for, by the second driving module 220, a second image (for example, the second image IMG2) to be displayed in the second region 120 of the display 100, based on the processing information PINFO.

According to an embodiment, the method may further include: displaying, by the first driving module 210, the first image IMG1 in the first region 110; and displaying, by the second driving module, the second image IMG2 in the second region 120.

According to an embodiment, the method may further include generating, by the second driving module 220, a luminance control signal for controlling light supplied to the display, based on the processing information PINFO about the first image IMG1.

According to an embodiment, the method may further include acquiring, by a processor (for example, the processor 300), frame image information which is to be supplied to the display 100, classifying the frame image information into the first image IMG1 to be displayed in the first region 110 and the second image IMG2 to be displayed in the second region 120, and respectively supplying the first image IMG1 and the second image IMG2 to the first driving module 210 and the second driving module 220.

According to an embodiment, the method may further include: checking, by the second driving module 220, states of the first driving module 210 and the second driving module 220; and transmitting, by the second driving module 220, a TE signal, indicating a state where the first driving module 210 and the second driving module 220 are capable of respectively receiving the first image IMG1 and the second image IMG2, to the processor 300.

According to an embodiment, the method may further include transmitting, by the processor 300, to the first driving module 210, a first command (for example, the first command CMD1) for setting a display condition (for example, gamma, luminance, brightness, chroma, contrast, sharpness, a color reproduction rate, a color, a display timing, and/or the like) of the first image IMG1; and transmit, by the processor 300, to the second driving module 220, a second command (for example, the second command CMD2) for setting a display condition of the second image IMG2.

According to an embodiment, the method may further include generating, by the second driving module 220, a command execution signal (for example, the execution signal EXE) which determines application timings of the first command CMD1 and the second command CMD2; and may be configured to applying, by the first driving module 210 and the second driving module 220, the first command CMD1 and the second command CMD2 to respective registers included therein in response to the command execution signal EXE.

According to an embodiment, the first command CMD1 may be configured to set a display condition identically or similarly to a display condition corresponding to the second command CMD2.

According to an embodiment, the method may further include generating, by each of the first and second driving modules 210 and 220, a timing control signal for controlling the first region 110 or the second region 120, based on image information corresponding to the first image IMG1 or the second image IMG2.

According to an embodiment, each of the first and second driving modules 210 and 220 may include a timing controller (for example, the timing controller TCON1 or TCON2) and process the first image IMG1 or the second image IMG2, based on the timing control signal.

According to an embodiment, the first driving module 210 may transmit or receive a signal to or from the second driving module 220 through an interface (for example, the internal interface IF2_1 or IF2_2).

According to an embodiment, the interface may include a serial interface.

According to an embodiment, each of the first and second driving modules 210 and 220 may be provided as a separate semiconductor chip.

According to an embodiment, the processing information PINFO may include at least one of pieces of processing information based on image processing results that are obtained in units of a pixel, a line, or a frame of the first image IMG1.

According to an embodiment, the processing information PINFO may include at least one selected from pixel data of at least a portion of the first image IMG1, which is displayed on a portion adjacent to the second region 120, and histogram information associated with the first image IMG1.

According to an embodiment, the method may further include generating, by the second driving module 220, other processing information (for example, the second processing information PINFO2) corresponding to the second image IMG2.

According to an embodiment, the method may further include compensating for, by the first driving module 210, the first image IMG1, based on the other processing information PINFO2.

According to an embodiment, the other processing information PINFO2 may include pixel data of at least a portion of the second image IMG2 that is displayed on a portion adjacent to the first region 110.

According to an embodiment, the method may further include generating, by the second driving module 220, compensation data (for example, the compensation data CDATA) for compensating for the first image IMG1 and the second image IMG2, based on the processing information PINFO and the other processing information PINFO2.

According to an embodiment, the compensation data CDATA may include at least one selected from luminance compensation data, gamma compensation data, and a pixel data scale value of an image.

According to an embodiment, each of the first and second driving modules 210 and 220 may be provided on at least a portion of a substrate where the display 100 is formed, and a communication channel (for example, at least one selected from the channel 1 CH1, the channel 2 CH2, and the channel 3 CH3) between the first and second driving modules 210 and 220 may be formed on the substrate.

A method of operating an electronic device (for example, the electronic device 1000) according to an embodiment may include: respectively outputting, by the processor 300, the first image IMG1 and the second image IMG2 to a first display driving module (for example, the first driving module 210) and second display driving module (for example, the second driving module 220); controlling, by the first display driving module 210, a first display (for example, the first display 101) for displaying the first image IMG1, and generating first image information (for example, the first processing information PINFO1) corresponding to the first image IMG1; controlling, by the second display driving module 220, a second display (for example, the second display 102) for displaying the second image IMG2, and generating second image information (for example, the second processing information PINFO2) corresponding to the second image IMG2; and generating, by the second driving module 220, compensation data about at least one selected from the first image information PINFO1 and the second image information PINFO2.

According to an embodiment, the method may further include transmitting, by the second display driving module 220, the compensation data CDATA to the first driving module 210.

According to an embodiment, the method may further include controlling, by the second display driving module 220, light supplied to the first and second displays 101 and 102, based on the first image information PINFO1 and the second image information PINFO2.

According to an embodiment, the method may further include controlling, by the second display driving module 220, pixel data values or gamma curves of the first image IMG1 and the second image IMG2, based on a luminance of the light.

According to an embodiment, each of the first and second displays 101 and 102 may include a pentile type pixel structure.

According to an embodiment, the method may further include controlling, by a third display driving module (for example, the third driving module 230), a third display for displaying a third image (for example, the third image IMG3) and generating third image information corresponding to the third image.

According to an embodiment, the first and second display driving modules 210 and 220 may be coupled to a PCB (for example, an FPCB) through a connector (for example, the connector CNT), and a communication channel (for example, at least one selected from the channel 1 CH1, the channel 2 CH2, and the channel 3 CH3) between the first and second display driving modules 210 and 220 may be formed on the FPCB.

According to an embodiment, the first display driving module 210 may communicate with the second display driving module 220 through the processor 300.

A method of operating an electronic device (for example, the electronic device 1000) according to another embodiment may include: receiving, by a first driving module (for example, the first driving module 210), a first image (for example, the first image IMG1), to be displayed in the first region 110, from a processor (for example, the processor 300) functionally coupled to a display panel (for example, the display panel 100) where a first driving module (for example, the first driving module 210) includes a first region (for example, the first region 110) and a second region (for example, the second region 120); generating, by the first driving module 210, first image information (for example, the first processing information PINFO1) corresponding to the first image IMG1; receiving, by a first driving module (for example, the first driving module 210), a first image (for example, the first image IMG1), to be displayed in the first region 110, from a processor (for example, the processor 300); receiving, by a second driving module (for example, the second driving module 220), a second image (for example, the second image IMG2), to be displayed in the second region 120, from the processor 300; and compensating for, by the second driving module 220, the second image IMG2 based on the first image information PINFO1.

According to an embodiment, each of the first and second driving modules 210 and 220 may receive the first image IMG1 or the second image IMG2 from the processor 300 through a first interface (for example, the host interface IF1_1 or IF1_2).

According to an embodiment, each of the first and second driving modules 210 and 220 may receive a signal (for example, the first image information PINFO1 or the second image information PINFO2) from the processor 300 through a second interface (for example, the internal interface IF2_1 or IF2_2).

According to an embodiment, the first driving module 210 or the second driving module 220 may generate the first image information PINFO1 or the second image information PINFO2 by using a timing controller (for example, the timing controller TCON1 or TCON2) included therein.

According to an embodiment, the first driving module 210 or the second driving module 220 may convert the compensated first image IMG1 or second image IMG2 into a grayscale voltage by using a source driver (for example, the source driver SDRV_1 or SDRV_2) included therein, and apply the grayscale voltage to the first region 110 or the second region 120 of the display panel 100.

Figure 24:
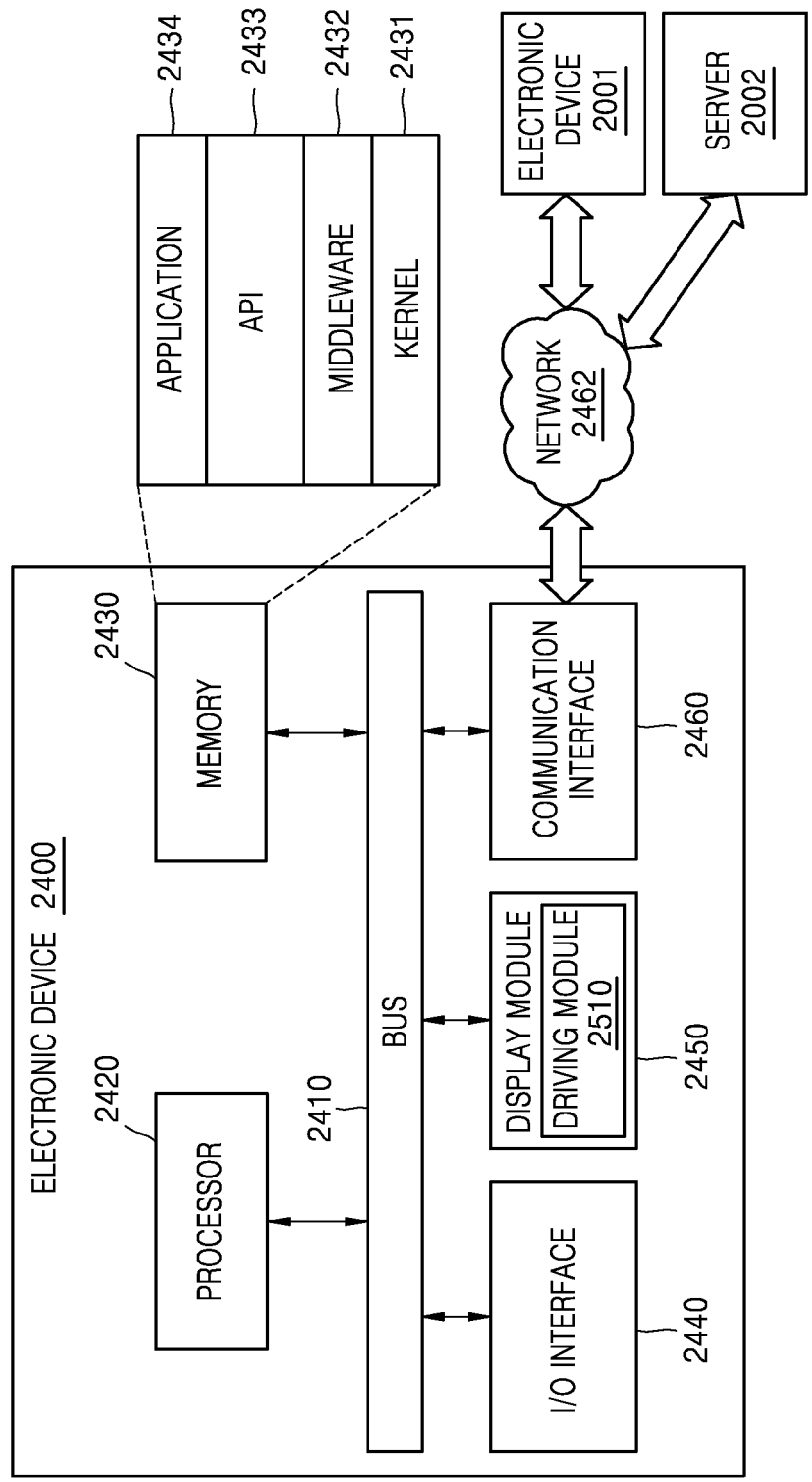
FIG. 24 is a diagram illustrating a network environment including an electronic device according to various embodiments of the present disclosure.

FIG. 24 is a diagram illustrating a network environment including an electronic device 2400 according to various embodiments of the present disclosure. Referring to FIG. 24, the electronic device 2400 may include a bus 2410, a processor 2420, a memory 2430, an input/output (I/O) interface 2440, a display module 2450, and a communication interface 2460.

The bus 2410 may be a circuit for connecting the above-described elements, and transferring communication (e.g., a control message) between the above-described elements.

The processor 2420 may receive an instruction from the above-described other elements (e.g., the memory 2430, the I/O interface 2440, the display module 2450, the communication interface 2460, etc.) via the bus 2410, for example, decipher the received instruction, and execute an operation or a data processing corresponding to the deciphered instruction.

The memory 2430 may store an instruction or data received from the processor 2420 or other elements (ex: the I/O interface 2440, the display module 2450, the communication interface 2460, etc.) or generated by the processor 2420 or the other elements. The memory 2430 may include, for example, programming modules such as a kernel 2431, a middleware 2432, an application programming interface (API) 2433, or an application 2434. Each of the above programming modules may include software, firmware, hardware, or a combination of at least two or more of these.

The kernel 2431 may control or manage system resources (e.g., the bus 2410, the processor 2420, or the memory 2430, etc.) used for executing an operation or a function implemented in the other program modules, for example, the middleware 2432, the API 2433, or the application 2434.

The kernel 2431 may provide an interface via which the middleware 2432, the API 2433, or the application 2434 may access an individual element of the electronic device 2400 and control or manage the same.

The middleware 2432 may perform a mediation role so that the API 2433 or the application 2434 may communication with the kernel 2431 to give and take data. Also, with regard to task requests received from the application 2434, the middleware 2432 may perform a control (e.g., scheduling or load balancing) for a task request using a method of assigning an order or priority that may use a system resource (e.g., the bus 2410, the processor 2420, or the memory 2430, etc.) of the electronic device 2400 to at least one application among applications 2434, for example.

The API 2433 is an interface via which the application 2434 may control a function provided by the kernel 2431 or the middleware 2432, and may include, for example, at least one interface or a function (e.g., an instruction) for a file control, a window control, image processing, or a character control, etc.

According to various embodiments, the application 2434 may include a short messaging service/multimedia messaging service (SMS/MMS) application, an e-mail application, a calendar application, an alarm application, a health care application (e.g., an application for measuring an exercise amount or a blood sugar), or an environment information application (e.g., an application for providing air pressure, humidity, or temperature information, etc.), etc. Additionally or generally, the application 2434 may be an application related to information exchange between the electronic device 2400 and an external electronic device 2001. The application related to information exchange may include, for example, a notification relay application for transferring specific information to an external electronic device, or a device management application for managing an external electronic device.

For example, the notification relay application may include a function for transferring notification information occurring from another application (e.g., an SMS/MMS application, an e-mail application, a health care application, or an environment information application, etc.) of the electronic device 2400 to an external electronic device (e.g., the electronic device 2001). Additionally or generally, the notification relay application, for example, may receive notification information from an external electronic device (e.g., the electronic device 2001) to provide the same to a user. The device management application, for example, may manage (e.g., install, delete, or update) a function (e.g., turn on/turn off of an external electronic device itself (or a portion of a constituent part) or control of brightness (or resolution) of a display, a service provided by an application operating in an external electronic device or provided by the external electronic device (e.g., a communication service or a message service) of at least a portion of an external electronic device (e.g., the electronic device 2001) communicating with the electronic device 2400.

According to various embodiments, the application 2434 may include an application designated depending on an attribute (e.g., the kind of an electronic device) of an external electronic device (e.g., the electronic device 2001). For example, in the case where an external electronic device is an MP3 player, the application 2434 may include an application related to music reproduction. Similarly, in the case where an external electronic device is a mobile medical device, the application 2434 may include an application related to a health care. According to an embodiment, the application 2434 may include at least one of an application designated to the electronic device 2400 or an application received from an external electronic device (e.g., a server 2002 or the electronic device 2001).

The I/O interface 2440 may transfer an instruction or data input from a user via an I/O unit (e.g., a sensor, a keyboard, a touchscreen, a speaker, or a microphone, etc.) to the processor 2420, the memory 2430, or the communication interface 2460, for example, via the bus 2410. For example, the I/O interface 2440 may provide, to the processor 2420, touch data based on a user touch that is input via a touch screen. Also, the I/O interface 2440 may output an instruction or data, which is received from the processor 2420, the memory 2430, or the communication interface 2460 via the bus 2410, via the I/O unit (e.g., a speaker or a display, etc.). For example, the I/O interface 2440 may output voice data, which is obtained through processing by the processor 2420, to a user via a speaker.

The display module 2450 may display various pieces of information (for example, multimedia data, text data, and/or the like) to a user. The display module 2450 may include a display (for example, a display panel, a projector, a hologram device, and/or the like (not shown)). The driving module 2510 may receive an image and drive display based on the image to display the image in the display. For example, the driving module 2510 may one of the driving modules described above with reference to FIGS. 1 to 17. The driving module 2510 may be a first driving module, a second driving module, or a driving module which is implemented by a combination of functions of the first and second driving modules.

The communication interface 2460 may establish communication between the electronic device 2400 and an external electronic device (e.g., the electronic device 2001 or the server 2002, etc.). For example, the communication interface 2460 may be connected to a network 2462 via wireless communication or wired communication to communicate with an external electronic device. The wireless communication, for example, may include at least one of Wi-Fi, Bluetooth (BT), near field communication (NFC), global positioning system (GPS), and cellular communication (e.g., LTE, LTE-A, CDMA, WCDMA, UMTs, WiBro, or GSM, etc.). The wired communication, for example, may include at least one of a universal serial bus (USB), a HDMI, a recommended standard-232 (RS-232), and plain old telephone service (POTS).

According to an embodiment, the network 2462 may be a telecommunications network. The telecommunications network may include at least one of a computer network, the Internet, an Internet of things, and a telephone network. According to an embodiment, a protocol (e.g., a transport layer protocol, a data link layer protocol, or a physical layer protocol) for communication between the electronic device 2400 and an external electronic device may be supported by at least one selected from the application 2434, the application programming interface 2433, the middleware 2432, the kernel 2431, and the communication interface 2460.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display including a first region and a second region configured to display a frame;
a first driving module configured to:
generate processing information corresponding to at least a first portion of one frame to be displayed in the first region of the display, and
display the first portion of the one frame in the first region of the display; and
a second driving module configured to:
receive the processing information from the first driving module,
compensate for a second portion of the one frame based on the processing information, and
display the second portion of the one frame based on the compensating in the second region of the display simultaneously with the displaying of the first driving module,
wherein the first portion and the second portion of the one frame are simultaneously displayed in the first region and the second region of the display respectively.

2. The electronic device of claim 1, wherein the second driving module is further configured to generate a luminance control signal for controlling light supplied to the display, based on the processing information.

3. The electronic device of claim 1, further comprising;
a processor configured to:
acquire frame image information to be supplied to the display,
classify the one frame image information into the first portion of the one frame to be displayed in the first region and the second portion of the one frame to be displayed in the second region, and
respectively supply the first portion of the one frame and the second portion of the one frame to the first driving module and the second driving module.

4. The electronic device of claim 3, wherein the second driving module is further configured to transmit a tearing effect control (TE) signal, indicating a state where the first driving module and the second driving module are capable of respectively receiving the first portion of the one frame and the second portion of the one frame, to the processor, based on a driving state of the first driving module and a driving state of the second driving module.

5. The electronic device of claim 3, wherein the processor is further configured to:
transmit, to the first driving module, a first command for setting a display condition of the first portion of the one frame, and
transmit, to the second driving module, a second command for setting a display condition of the second portion of the one frame.

6. The electronic device of claim 5,
wherein the second driving module is further configured to generate a command execution signal which determines application timings of the first command and the second command, and
wherein the first driving module and the second driving module are further configured to apply the first command and the second command to respective registers included therein in response to the command execution signal.

7. The electronic device of claim 5, wherein the first command is configured to set a display condition identically to a display condition corresponding to the second command.

8. The electronic device of claim 1, wherein each of the first and second driving modules comprises a timing controller configured to generate a timing control signal for controlling the first region or the second region, based on frame information corresponding to the first portion of the one frame or the second portion of the one frame, and to process the first portion of the one frame or the second portion of the one frame, based on the timing control signal.

9. The electronic device of claim 1, wherein each of the first and second driving modules comprises an interface that transmits or receives a signal between the first driving module and the second driving module.

10. The electronic device of claim 9, wherein the interface includes a serial interface.

11. The electronic device of claim 1, wherein each of the first and second driving modules is provided as a separate semiconductor chip.

12. The electronic device of claim 1, wherein the second driving module is further configured to transmit, to the first driving module, an information request signal for requesting the processing information.

13. The electronic device of claim 1, wherein the processing information comprises at least one of pieces of processing information based on image processing results that are obtained in units of a pixel, a line, or a frame of the first portion of the one frame.

14. The electronic device of claim 1, wherein the processing information comprises at least one selected from pixel data of at least a portion of the first portion of the one frame, which is displayed on a portion adjacent to the second region, and histogram information associated with the first portion of the one frame.

15. The electronic device of claim 1, wherein the second driving module is further configured to generate other processing information corresponding to the second portion of the one frame.

16. The electronic device of claim 15, wherein the first driving module is further configured to compensate for the first portion of the one frame, based on the other processing information.

17. The electronic device of claim 15, wherein the other processing information comprises pixel data of at least a portion of the second portion of the one frame which is displayed on a portion adjacent to the first region.

18. The electronic device of claim 15, wherein the second driving module is further configured to generate compensation data for compensating for the first portion of the one frame and the second portion of the one frame, based on the processing information and the other processing information.

19. The electronic device of claim 18, wherein the compensation data comprises at least one selected from luminance compensation data, gamma compensation data, and a pixel data scale value of an image.

20. The electronic device of claim 1,
wherein each of the first and second driving modules is provided on at least a portion of a substrate where the display is formed, and
wherein a communication channel between the first driving module and the second driving module is formed on the substrate.

21. An electronic device comprising:
a first display configured to display a first portion of one frame;
a second display configured to display a second portion of the one frame, wherein the first portion and the second portion of the one frame are simultaneously displayed in the first display and the second display respectively;
a first display driving module configured to:
control the first display, and
generate first image information corresponding to the first portion of the one frame;
a second display driving module configured to:
control the second display,
generate second image information corresponding to the second portion of the one frame, and
generate compensation data for compensating at least one selected from the first portion of the one frame and the second portion of the one frame, based on the first image information and the second image information; and
a processor configured to transmit the first portion of the one frame to the first display driving module, and to transmit the second portion of the one frame to the second display driving module,
wherein at least one selected from the first portion of the one frame and the second portion of the one frame is displayed with compensating based on the compensation data.

22. The electronic device of claim 21, wherein the second display driving module is further configured to transmit the compensation data to the first display driving module.

23. The electronic device of claim 21, wherein the second display driving module is further configured to control light supplied to the first display and the second display, based on the first image information and the second image information.

24. The electronic device of claim 23, wherein the second display driving module is further configured to control pixel data or gamma curves of the first portion of the one frame and the second portion of the one frame, based on a luminance of the light.

25. The electronic device of claim 21, wherein each of the first display and the second display comprises a pentile type pixel structure.

26. The electronic device of claim 21, further comprising:
a third display configured to display a third image; and
a third display driving module configured to generate third image information corresponding to the third image.

27. The electronic device of claim 21,
wherein the first display driving module and the second display driving module are coupled to a printed circuit board (PCB) through a connector, and
wherein a communication channel between the first display driving module and the second display driving module is formed on the PCB.

28. The electronic device of claim 21, wherein the first display driving module is further configured to communicate with the second display driving module through the processor.

29. A display apparatus comprising:
a display panel including a first region and a second region;
a first driving module configured to:
receive a first image belonging to one frame to be displayed in the first region from a processor functionally coupled to the display panel,
generate first image information corresponding to the first image, and
display the first image in the first region of the display; and
a second driving module configured to:
receive from the processor a second image belonging to the same one frame to be displayed in the second region,
compensate for the second image, based on the first image information, and
display the second image based on the compensating in the second region of the display,
wherein the first image and the second image belonging to the one frame are simultaneously displayed in the first region and the second region of the display respectively.

30. The display apparatus of claim 29, wherein each of the first and second driving modules is provided as a separate semiconductor chip.

31. The display apparatus of claim 29, wherein each of the first and second driving modules comprises:
a source driver configured to apply a grayscale voltage to the display panel;
a timing controller configured to perform image processing on a received image;
a first interface configured to transmit or receive a signal to or from the processor; and
a second interface configured to transmit or receive a signal between the first driving module and the second driving module.

32. A method of operating an electronic device, the method comprising:
respectively receiving, by a first driving module and a second driving module, a first image of one frame and a second image of the same one frame;
generating, by the first driving module, processing information based on the first image of the one frame;
transmitting the processing information to the second driving module;
compensating for, by the second driving module, the second image of the one frame based on the processing information; and
respectively displaying the first image and the second image of the one frame in a first region and a second region of a display simultaneously,
wherein the second image of the one frame is displayed based on the compensating.

33. The method of claim 32, further comprising:
generating, by the second driving module, other processing information, based on the second image of the one frame;
transmitting the other processing information to the first driving module; and
compensating for, by the first driving module, the first image of the one frame based on the transmitted other processing information,
wherein the respectively displaying the first image and the second image of the one frame comprises simultaneously displaying the compensated first image and the compensated second image of the one frame in a first region and a second region of a display.

34. The method of claim 32, further comprising acquiring, by a processor, a frame image to classify the one frame into one of the first image and the second image.

35. The method of claim 32, wherein the processing information comprises at least one selected from pixel data of at least a portion of the first image and histogram information associated with the first image.

36. The method of claim 32, wherein the respectively receiving of the first image and the second image comprises receiving the first image and the second image along with a first command for setting a display condition of the first image and a second command for setting a display condition of the second image.

37. The method of claim 36, further comprising:
generating a command execution signal that determines a command application timing in the second driving module; and
respectively applying the first command and the second command to an internal register of the first driving module and an internal register of the second driving module in response to the command execution signal.

38. The method of claim 36, wherein the transmitting of the processing information comprises transmitting the processing information through a communication channel between the first driving module and the second driving module.

39. An image display method performed by an electronic device, the image display method comprising:
respectively receiving, by a first driving module and a second driving module, a first portion of one frame and a second portion of the one frame, wherein the first portion and the second portion of the one frame are simultaneously displayed in the first region and the second region of a display respectively;
generating, by the first driving module, first processing information based on the first portion of the one frame;
generating, by the second driving module, second processing information based on the second portion of the one frame;
transmitting the first processing information to the second driving module;
generating, by the second driving module, compensation data for compensating the first portion and the second portion of the one frame, based on the first processing information and the second processing information:
transmitting, by the second driving module, the compensation data to the first driving module;
compensating for, by the first driving module and the second driving module, the first portion of the one frame and the second portion of the one frame, respectively; and
respectively displaying, by the first driving module and the second driving module, the first portion of the one frame and the second portion of the one frame in the first region and the second region of a display, with the compensating.

40. The image display method of claim 39, wherein the compensation data comprises at least one selected from luminance compensation data, gamma compensation data, and a pixel data scale value of an image.

41. The image display method of claim 39, wherein the compensating of the first portion of the one frame and the second portion of the one frame comprises controlling pixel data or gamma curves of the first portion of the one frame and the second portion of the one frame.

42. The image display method of claim 39, wherein each of the first portion of the one frame and the second portion of the one frame is at least a portion of a frame image displayed by the display.

\* \* \* \* \*